(12) United States Patent
Palmer et al.

(10) Patent No.: US 9,501,878 B2
(45) Date of Patent: Nov. 22, 2016

(54) VEHICLE EVENT PLAYBACK APPARATUS AND METHODS

(71) Applicant: SmartDrive Systems, Inc., San Diego, CA (US)

(72) Inventors: Jason Palmer, Carlsbad, CA (US); Slaven Sljivar, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 48 days.

(21) Appl. No.: 14/055,833

(22) Filed: Oct. 16, 2013

(65) Prior Publication Data

US 2015/0105934 A1 Apr. 16, 2015

(51) Int. Cl.
*G07C 5/08* (2006.01)
*G11B 27/10* (2006.01)

(52) U.S. Cl.
CPC .............. *G07C 5/0841* (2013.01); *G07C 5/08* (2013.01); *G11B 27/10* (2013.01)

(58) Field of Classification Search
CPC ....... G11B 27/10; G07C 5/08; G07C 5/0841
USPC ............................................................ 701/1
See application file for complete search history.

(56) References Cited

U.S. PATENT DOCUMENTS

| | | |
|---|---|---|
| 673,203 A | 4/1901 | Freund |
| 673,795 A | 5/1901 | Hammer |
| 673,907 A | 5/1901 | Johnson |
| 676,075 A | 6/1901 | McDougall |
| 679,511 A | 7/1901 | Richards |
| 681,036 A | 8/1901 | Burg |
| 681,283 A | 8/1901 | Waynick |
| 681,998 A | 9/1901 | Swift |
| 683,155 A | 9/1901 | Thompson |
| 683,214 A | 9/1901 | Mansfield |
| 684,276 A | 10/1901 | Lonergan |
| 685,082 A | 10/1901 | Wood |
| 685,969 A | 11/1901 | Campbell |
| 686,545 A | 11/1901 | Selph |

(Continued)

FOREIGN PATENT DOCUMENTS

| | | |
|---|---|---|
| CA | 2469728 | 12/2005 |
| CA | 2469728 A1 | 12/2005 |

(Continued)

OTHER PUBLICATIONS

Ambulance Companies Use Video Technology to Improve Driving Behavior, Ambulance Industry Journal, Spring 2003.

(Continued)

*Primary Examiner* — Khoi Tran
*Assistant Examiner* — Robert Nguyen
(74) *Attorney, Agent, or Firm* — Sheppard Mullin Richter & Hampton LLP

(57) ABSTRACT

Vehicle event data playback systems described herein may provide users means for reviewing events recorded by a vehicle event recorder. Circumstances relating to vehicle operation may be visually presented in these playback systems. Video playback from multiple recording devices may be synchronized with each other and/or with information related to the operation of the vehicle during the recorded events to affect a presentation of information related to operation of the vehicle. A user may be presented with many data types in graphical and/or intuitive arrangements.

23 Claims, 17 Drawing Sheets

(56) References Cited

U.S. PATENT DOCUMENTS

| | | |
|---|---|---|
| 689,849 A | 12/1901 | Brown |
| 691,982 A | 1/1902 | Sturgis |
| 692,834 A | 2/1902 | Davis |
| 694,781 A | 3/1902 | Prinz |
| 2,943,141 A | 6/1960 | Knight |
| 3,634,866 A | 1/1972 | Meyer |
| 3,781,824 A | 12/1973 | Caiati |
| 3,812,287 A | 5/1974 | Lemelson |
| 3,885,090 A | 5/1975 | Rosenbaum |
| 3,992,656 A | 11/1976 | Joy |
| 4,054,752 A | 10/1977 | Dennis |
| 4,072,850 A | 2/1978 | McGlynn |
| 4,258,421 A | 3/1981 | Juhasz |
| 4,271,358 A | 6/1981 | Schwarz |
| 4,276,609 A | 6/1981 | Patel |
| 4,280,151 A | 7/1981 | Tsunekawa |
| 4,281,354 A | 7/1981 | Conte |
| 4,401,976 A | 8/1983 | Stadelmayr |
| 4,409,670 A | 10/1983 | Herndon |
| 4,420,773 A | 12/1983 | Toyoda |
| 4,425,097 A | 1/1984 | Owens |
| 4,456,931 A | 6/1984 | Toyoda |
| 4,489,351 A | 12/1984 | d'Alayer de Costemore |
| 4,496,995 A | 1/1985 | Colles |
| 4,500,868 A | 2/1985 | Tokitsu |
| 4,528,547 A | 7/1985 | Rodney |
| 4,533,962 A | 8/1985 | Decker |
| 4,558,379 A | 12/1985 | Hutter |
| 4,588,267 A | 5/1986 | Pastore |
| 4,593,313 A | 6/1986 | Nagasaki |
| 4,621,335 A | 11/1986 | Bluish |
| 4,625,210 A | 11/1986 | Sagl |
| 4,630,110 A | 12/1986 | Cotton |
| 4,632,348 A | 12/1986 | Keesling |
| 4,638,289 A | 1/1987 | Zottnik |
| 4,646,241 A | 2/1987 | Ratchford |
| 4,651,143 A | 3/1987 | Yamanaka |
| 4,671,111 A | 6/1987 | Lemelson |
| 4,718,685 A | 1/1988 | Kawabe |
| 4,754,255 A | 6/1988 | Sanders |
| 4,758,888 A | 7/1988 | Lapidot |
| 4,763,745 A | 8/1988 | Eto |
| 4,785,474 A | 11/1988 | Bernstein |
| 4,789,904 A | 12/1988 | Peterson |
| 4,794,566 A | 12/1988 | Richards |
| 4,804,937 A | 2/1989 | Barbiaux |
| 4,806,931 A | 2/1989 | Nelson |
| 4,807,096 A | 2/1989 | Skogler |
| 4,814,896 A | 3/1989 | Heitzman |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,853,856 A | 8/1989 | Hanway |
| 4,853,859 A | 8/1989 | Morita |
| 4,866,616 A | 9/1989 | Takeuchi |
| 4,876,597 A | 10/1989 | Roy |
| 4,883,349 A | 11/1989 | Mittelhaeuser |
| 4,896,855 A | 1/1990 | Furnish |
| 4,926,331 A | 5/1990 | Windle |
| 4,930,742 A | 6/1990 | Schofield |
| 4,936,533 A | 6/1990 | Adams |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente |
| 4,992,943 A | 2/1991 | McCracken |
| 4,993,068 A | 2/1991 | Piosenka |
| 4,995,086 A | 2/1991 | Lilley |
| 5,012,335 A | 4/1991 | Cohodar |
| 5,027,104 A | 6/1991 | Reid |
| 5,046,007 A | 9/1991 | McCrery |
| 5,050,166 A | 9/1991 | Cantoni |
| 5,056,056 A | 10/1991 | Gustin |
| 5,057,820 A | 10/1991 | Markson |
| 5,096,287 A | 3/1992 | Kakinami |
| 5,100,095 A | 3/1992 | Haan |
| 5,111,289 A | 5/1992 | Lucas |
| 5,140,434 A | 8/1992 | Van Blessinger et al. |
| 5,140,436 A | 8/1992 | Blessinger |
| 5,140,438 A | 8/1992 | Blessinger |
| 5,144,661 A | 9/1992 | Shamosh |
| 5,178,448 A | 1/1993 | Adams |
| 5,185,700 A | 2/1993 | Bezos |
| 5,196,938 A | 3/1993 | Blessinger |
| 5,223,844 A | 6/1993 | Mansell |
| 5,224,211 A | 6/1993 | Roe |
| 5,262,813 A | 11/1993 | Scharton |
| 5,283,433 A | 2/1994 | Tsien |
| 5,294,978 A | 3/1994 | Katayama |
| 5,305,214 A | 4/1994 | Komatsu |
| 5,305,216 A | 4/1994 | Okura |
| 5,308,247 A | 5/1994 | Dyrdek |
| 5,309,485 A | 5/1994 | Chao |
| 5,311,197 A | 5/1994 | Sorden |
| 5,321,753 A | 6/1994 | Gritton |
| 5,327,288 A | 7/1994 | Wellington |
| 5,330,149 A | 7/1994 | Haan |
| 5,343,527 A | 8/1994 | Moore |
| 5,353,023 A | 10/1994 | Mitsugi |
| 5,361,326 A | 11/1994 | Aparicio |
| 5,387,926 A | 2/1995 | Bellan |
| 5,388,045 A | 2/1995 | Kamiya |
| 5,388,208 A | 2/1995 | Weingartner |
| 5,404,330 A | 4/1995 | Lee |
| 5,408,330 A | 4/1995 | Squicciarini |
| 5,422,543 A | 6/1995 | Weinberg |
| 5,430,431 A | 7/1995 | Nelson |
| 5,430,432 A | 7/1995 | Camhi |
| 5,435,184 A | 7/1995 | Pineroli |
| 5,445,024 A | 8/1995 | Riley |
| 5,445,027 A | 8/1995 | Zoerner |
| 5,446,659 A | 8/1995 | Yamawaki |
| 5,455,625 A | 10/1995 | Englander |
| 5,455,716 A | 10/1995 | Suman |
| 5,465,079 A | 11/1995 | Bouchard |
| 5,473,729 A | 12/1995 | Bryant |
| 5,477,141 A | 12/1995 | Nather |
| 5,495,242 A | 2/1996 | Kick |
| 5,495,243 A | 2/1996 | McKenna |
| 5,497,419 A | 3/1996 | Hill |
| 5,499,182 A | 3/1996 | Ousborne |
| 5,504,482 A | 4/1996 | Schreder |
| 5,513,011 A | 4/1996 | Matsumoto |
| 5,515,285 A | 5/1996 | Garrett |
| 5,519,260 A | 5/1996 | Washington |
| 5,521,633 A | 5/1996 | Nakajima |
| 5,523,811 A | 6/1996 | Wada |
| 5,526,269 A | 6/1996 | Ishibashi |
| 5,530,420 A | 6/1996 | Tsuchiya |
| 5,532,678 A | 7/1996 | Kin |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii |
| 5,546,191 A | 8/1996 | Hibi |
| 5,546,305 A | 8/1996 | Kondo |
| 5,548,273 A | 8/1996 | Nicol |
| 5,552,990 A | 9/1996 | Ihara |
| 5,559,496 A | 9/1996 | Dubats |
| 5,568,211 A | 10/1996 | Bamford |
| 5,570,087 A | 10/1996 | Lemelson |
| 5,570,127 A | 10/1996 | Schmidt |
| 5,574,424 A | 11/1996 | Nguyen |
| 5,574,443 A | 11/1996 | Hsieh |
| D376,571 S | 12/1996 | Kokat |
| 5,581,464 A | 12/1996 | Woll |
| 5,586,130 A | 12/1996 | Doyle |
| 5,590,948 A | 1/1997 | Moreno |
| 5,596,382 A | 1/1997 | Bamford |
| 5,600,775 A | 2/1997 | King |
| 5,608,272 A | 3/1997 | Tanguay |

(56) References Cited

U.S. PATENT DOCUMENTS

| | | |
|---|---|---|
| 5,610,580 A | 3/1997 | Lai |
| 5,612,686 A | 3/1997 | Takano |
| 5,631,638 A | 5/1997 | Kaspar |
| 5,638,273 A | 6/1997 | Coiner |
| 5,642,106 A | 6/1997 | Hancock |
| 5,646,856 A | 7/1997 | Kaesser |
| 5,652,706 A | 7/1997 | Morimoto |
| RE35,590 E | 8/1997 | Bezos |
| 5,654,892 A | 8/1997 | Fujii |
| 5,659,355 A | 8/1997 | Barron |
| 5,666,120 A | 9/1997 | Kline |
| 5,667,176 A | 9/1997 | Zamarripa |
| 5,669,698 A | 9/1997 | Veldman |
| 5,671,451 A | 9/1997 | Takahashi |
| 5,677,979 A | 10/1997 | Squicciarini |
| 5,680,117 A | 10/1997 | Arai |
| 5,680,123 A | 10/1997 | Lee |
| 5,686,765 A | 11/1997 | Washington |
| 5,686,889 A | 11/1997 | Hillis |
| 5,689,442 A | 11/1997 | Swanson |
| 5,696,705 A | 12/1997 | Zykan |
| 5,706,362 A | 1/1998 | Yabe |
| 5,706,909 A | 1/1998 | Bevins |
| 5,712,679 A | 1/1998 | Coles |
| 5,717,456 A | 2/1998 | Rudt |
| 5,719,554 A | 2/1998 | Gagnon |
| 5,758,299 A | 5/1998 | Sandborg |
| 5,781,101 A | 7/1998 | Stephen |
| 5,781,145 A | 7/1998 | Williams |
| 5,784,007 A | 7/1998 | Pepper |
| 5,784,021 A | 7/1998 | Oliva |
| 5,784,521 A | 7/1998 | Nakatani |
| 5,790,403 A | 8/1998 | Nakayama |
| 5,790,973 A | 8/1998 | Blaker |
| 5,793,308 A | 8/1998 | Rosinski |
| 5,793,420 A | 8/1998 | Schmidt |
| 5,793,739 A | 8/1998 | Tanaka |
| 5,793,985 A | 8/1998 | Natarajan |
| 5,794,165 A | 8/1998 | Minowa |
| 5,797,134 A | 8/1998 | McMillan |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank |
| 5,805,079 A | 9/1998 | Lemelson |
| 5,813,745 A | 9/1998 | Fant |
| 5,815,071 A | 9/1998 | Doyle |
| 5,815,093 A | 9/1998 | Kikinis |
| 5,819,198 A | 10/1998 | Peretz |
| 5,825,284 A | 10/1998 | Dunwoody |
| 5,825,412 A | 10/1998 | Hobson |
| 5,844,505 A | 12/1998 | Van |
| 5,845,733 A | 12/1998 | Wolfsen |
| 5,867,802 A | 2/1999 | Borza |
| 5,877,897 A | 3/1999 | Schofield |
| 5,896,167 A | 4/1999 | Omae |
| 5,897,602 A | 4/1999 | Mizuta |
| 5,897,606 A | 4/1999 | Miura |
| 5,899,956 A | 5/1999 | Chan |
| 5,901,806 A | 5/1999 | Takahashi |
| 5,914,748 A | 6/1999 | Parulski |
| 5,919,239 A | 7/1999 | Fraker |
| 5,926,210 A | 7/1999 | Hackett |
| 5,928,291 A | 7/1999 | Jenkins |
| 5,938,321 A | 8/1999 | Bos |
| 5,946,404 A | 8/1999 | Bakshi |
| 5,948,038 A | 9/1999 | Daly |
| 5,959,367 A | 9/1999 | OFarrell |
| 5,978,017 A | 11/1999 | Tino |
| 6,002,326 A | 12/1999 | Turner |
| 6,006,148 A | 12/1999 | Strong |
| 6,008,723 A | 12/1999 | Yassan |
| 6,008,841 A | 12/1999 | Charlson |
| 6,009,370 A | 12/1999 | Minowa |
| 6,011,492 A | 1/2000 | Garesche |
| 6,028,528 A | 2/2000 | Lorenzetti |
| 6,037,860 A | 3/2000 | Zander |
| 6,037,977 A | 3/2000 | Peterson |
| 6,041,410 A | 3/2000 | Hsu |
| 6,049,079 A | 4/2000 | Noordam |
| 6,057,754 A | 5/2000 | Kinoshita |
| 6,060,989 A | 5/2000 | Gehlot |
| 6,064,792 A | 5/2000 | Fox |
| 6,067,488 A | 5/2000 | Tano |
| 6,076,026 A | 6/2000 | Jambhekar |
| 6,084,870 A | 7/2000 | Wooten |
| 6,088,635 A | 7/2000 | Cox |
| 6,092,008 A | 7/2000 | Bateman |
| 6,092,021 A | 7/2000 | Ehlbeck |
| 6,092,193 A | 7/2000 | Loomis |
| 6,100,811 A | 8/2000 | Hsu |
| 6,111,254 A | 8/2000 | Eden |
| 6,118,768 A | 9/2000 | Bhatia |
| 6,122,738 A | 9/2000 | Millard |
| 6,141,611 A | 10/2000 | Mackey |
| 6,144,296 A | 11/2000 | Ishida |
| 6,147,598 A | 11/2000 | Murphy |
| 6,151,065 A | 11/2000 | Steed |
| 6,163,338 A | 12/2000 | Johnson |
| 6,163,749 A | 12/2000 | McDonough |
| 6,167,186 A | 12/2000 | Kawasaki |
| 6,170,742 B1 | 1/2001 | Yacoob |
| 6,181,373 B1 | 1/2001 | Coles |
| 6,182,010 B1 | 1/2001 | Berstis |
| 6,185,490 B1 | 2/2001 | Ferguson |
| 6,195,605 B1 | 2/2001 | Tabler |
| 6,200,139 B1 | 3/2001 | Clapper |
| 6,208,919 B1 | 3/2001 | Barkesseh |
| 6,211,907 B1 | 4/2001 | Scaman |
| 6,218,960 B1 | 4/2001 | Ishikawa |
| 6,246,933 B1 | 6/2001 | Bague |
| 6,246,934 B1 | 6/2001 | Otake |
| 6,252,544 B1 | 6/2001 | Hoffberg |
| 6,253,129 B1 | 6/2001 | Jenkins |
| 6,259,475 B1 | 7/2001 | Ramachandran |
| 6,263,265 B1 | 7/2001 | Fera |
| 6,266,588 B1 | 7/2001 | McClellan |
| 6,298,290 B1 | 10/2001 | Abe |
| 6,300,875 B1 | 10/2001 | Schafer |
| 6,324,450 B1 | 11/2001 | Iwama |
| 6,333,759 B1 | 12/2001 | Mazzilli |
| 6,337,622 B1 | 1/2002 | Sugano |
| 6,349,250 B1 | 2/2002 | Hart |
| 6,353,734 B1 | 3/2002 | Wright |
| 6,356,823 B1 | 3/2002 | Iannotti |
| 6,360,147 B1 | 3/2002 | Lee |
| 6,366,207 B1 | 4/2002 | Murphy |
| 6,389,339 B1 | 5/2002 | Just |
| 6,389,340 B1 | 5/2002 | Rayner |
| 6,400,835 B1 | 6/2002 | Lemelson |
| 6,405,112 B1 | 6/2002 | Rayner |
| 6,405,132 B1 | 6/2002 | Breed |
| 6,408,232 B1 | 6/2002 | Cannon |
| 6,411,874 B2 | 6/2002 | Morgan |
| 6,421,080 B1 | 7/2002 | Lambert |
| 6,434,510 B1 | 8/2002 | Callaghan |
| 6,449,540 B1 | 9/2002 | Rayner |
| 6,456,321 B1 | 9/2002 | Ito |
| 6,459,988 B1 | 10/2002 | Fan |
| 6,470,241 B2 | 10/2002 | Yoshikawa |
| 6,472,771 B1 | 10/2002 | Frese |
| 6,490,513 B1 | 12/2002 | Fish |
| 6,493,650 B1 | 12/2002 | Rodgers |
| 6,505,106 B1 | 1/2003 | Lawrence |
| 6,507,838 B1 | 1/2003 | Syeda-Mahmood |
| 6,508,400 B1 | 1/2003 | Ishifuji |
| 6,516,256 B1 | 2/2003 | Hartmann |
| 6,518,881 B2 | 2/2003 | Monroe |
| 6,525,672 B2 | 2/2003 | Chainer |
| 6,529,159 B1 | 3/2003 | Fan |
| 6,535,804 B1 | 3/2003 | Chun |
| 6,552,682 B1 | 4/2003 | Fan |
| 6,556,905 B1 | 4/2003 | Mittelsteadt |
| 6,559,769 B2 | 5/2003 | Anthony |

(56) References Cited

U.S. PATENT DOCUMENTS

| | | |
|---|---|---|
| 6,574,538 B2 | 6/2003 | Sasaki |
| 6,575,902 B1 | 6/2003 | Burton |
| 6,580,373 B1 | 6/2003 | Ohashi |
| 6,580,983 B2 | 6/2003 | Laguer-Diaz |
| 6,593,848 B1 | 7/2003 | Atkins, III |
| 6,594,576 B2 | 7/2003 | Fan |
| 6,611,740 B2 | 8/2003 | Lowrey |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,665,613 B2 | 12/2003 | Duvall |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,721,652 B1 | 4/2004 | Sanqunetti |
| 6,728,612 B1 | 4/2004 | Carver |
| 6,732,031 B1 | 5/2004 | Lightner |
| 6,732,032 B1 | 5/2004 | Banet |
| 6,735,503 B2 | 5/2004 | Ames |
| 6,737,954 B2 | 5/2004 | Chainer |
| 6,738,697 B2 | 5/2004 | Breed |
| 6,739,078 B2 | 5/2004 | Morley |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg |
| 6,762,513 B2 | 7/2004 | Landgraf |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Oda |
| 6,810,362 B2 | 10/2004 | Adachi |
| 6,812,831 B2 | 11/2004 | Ikeda |
| 6,819,989 B2 | 11/2004 | Maeda |
| 6,831,556 B1 | 12/2004 | Boykin |
| 6,832,140 B2 | 12/2004 | Fan |
| 6,832,141 B2 | 12/2004 | Skeen |
| 6,836,712 B2 | 12/2004 | Nishina |
| 6,842,762 B2 | 1/2005 | Raithel |
| 6,847,873 B1 | 1/2005 | Li |
| 6,850,823 B2 | 2/2005 | Eun |
| 6,859,695 B2 | 2/2005 | Klausner |
| 6,859,705 B2 | 2/2005 | Rao |
| 6,862,524 B1 | 3/2005 | Nagda |
| 6,865,457 B1 | 3/2005 | Mittelsteadt |
| 6,867,733 B2 | 3/2005 | Sandhu |
| 6,873,261 B2 | 3/2005 | Anthony |
| 6,882,313 B1 | 4/2005 | Fan |
| 6,882,912 B2 | 4/2005 | DiLodovico |
| 6,894,606 B2 | 5/2005 | Forbes |
| 6,895,248 B1 | 5/2005 | Akyol |
| 6,898,492 B2 | 5/2005 | De Leon |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,988,034 B1 | 1/2006 | Marlatt |
| 7,003,289 B1 | 2/2006 | Kolls |
| 7,012,632 B2 | 3/2006 | Freeman |
| 7,020,548 B2 | 3/2006 | Saito |
| 7,023,333 B2 | 4/2006 | Blanco |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,082,382 B1 | 7/2006 | Rose et al. |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,138,904 B1 | 11/2006 | Dutu |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,254,482 B2 | 8/2007 | Kawasaki |
| 7,265,663 B2 | 9/2007 | Steele |
| 7,266,507 B2 | 9/2007 | Simon |
| 7,272,179 B2 | 9/2007 | Siemens |
| 7,308,341 B2 | 12/2007 | Schofield |
| 7,317,974 B2 | 1/2008 | Luskin |
| 7,343,306 B1 | 3/2008 | Bates |
| 7,348,895 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 | 6/2008 | Basir |
| 7,389,178 B2 | 6/2008 | Raz |
| 7,457,693 B2 | 11/2008 | Olsen |
| 7,471,189 B2 | 12/2008 | Vastad |
| 7,471,192 B2 | 12/2008 | Hara |
| 7,536,457 B2 | 5/2009 | Miller |
| 7,561,054 B2 | 7/2009 | Raz |
| 7,584,033 B2 | 9/2009 | Mittelsteadt |
| 7,623,754 B1 | 11/2009 | McKain |
| 7,659,827 B2 | 2/2010 | Gunderson |
| 7,659,835 B2 | 2/2010 | Jung |
| 7,667,731 B2 | 2/2010 | Kreiner |
| 7,702,442 B2 | 4/2010 | Takenaka |
| 7,725,216 B2 | 5/2010 | Kim |
| 7,768,548 B2 | 8/2010 | Silvernail |
| 7,769,499 B2 | 8/2010 | McQuade |
| 7,783,956 B2 | 8/2010 | Ko |
| 7,804,426 B2 | 9/2010 | Etcheson |
| 7,821,421 B2 | 10/2010 | Tamir |
| 7,853,376 B2 | 12/2010 | Peng |
| 7,893,958 B1 | 2/2011 | DAgostino |
| 7,940,250 B2 | 5/2011 | Forstall |
| 7,941,258 B1 | 5/2011 | Mittelsteadt |
| 7,974,748 B2 | 7/2011 | Goerick |
| 8,054,168 B2 | 11/2011 | McCormick |
| 8,068,979 B2 | 11/2011 | Breed |
| 8,090,598 B2 | 1/2012 | Bauer |
| 8,113,844 B2 | 2/2012 | Huang |
| 8,139,820 B2 | 3/2012 | Plante |
| 8,140,265 B2 | 3/2012 | Grush |
| 8,140,358 B1 | 3/2012 | Ling |
| 8,152,198 B2 | 4/2012 | Breed |
| 8,239,092 B2 | 8/2012 | Plante |
| 8,269,617 B2 | 9/2012 | Cook |
| 8,311,858 B2 | 11/2012 | Everett |
| 8,314,708 B2 | 11/2012 | Gunderson |
| 8,321,066 B2 | 11/2012 | Becker |
| 8,373,567 B2 | 2/2013 | Denson |
| 8,417,562 B1 | 4/2013 | Siemens |
| 8,442,690 B2 | 5/2013 | Goldstein |
| 8,471,701 B2 | 6/2013 | Yariv |
| 8,508,353 B2 | 8/2013 | Cook |
| 8,538,696 B1 | 9/2013 | Cassanova |
| 8,538,785 B2 | 9/2013 | Coleman |
| 8,564,426 B2 | 10/2013 | Cook |
| 8,564,446 B2 | 10/2013 | Gunderson |
| 8,571,755 B2 | 10/2013 | Plante |
| 8,577,703 B2 | 11/2013 | McClellan |
| 8,606,492 B1 | 12/2013 | Botnen |
| 8,635,557 B2 | 1/2014 | Geise |
| 8,676,428 B2 | 3/2014 | Richardson |
| 8,744,642 B2 | 6/2014 | Nemat-Nasser |

(56) References Cited

U.S. PATENT DOCUMENTS

| | | |
|---|---|---|
| 8,775,067 B2 | 7/2014 | Cho |
| 8,781,292 B1 * | 7/2014 | Ross .................. G11B 27/11 386/223 |
| 8,803,695 B2 | 8/2014 | Denson |
| 8,805,110 B2 | 8/2014 | Rhoads |
| 8,849,501 B2 | 9/2014 | Cook |
| 8,855,847 B2 | 10/2014 | Uehara |
| 8,868,288 B2 | 10/2014 | Plante |
| 8,880,279 B2 | 11/2014 | Plante |
| 8,892,310 B1 | 11/2014 | Palmer |
| 8,989,959 B2 | 3/2015 | Plante |
| 8,996,234 B1 | 3/2015 | Tamari |
| 8,996,240 B2 | 3/2015 | Plante |
| 9,047,721 B1 | 6/2015 | Botnen |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,240,079 B2 | 1/2016 | Lambert |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2001/0052730 A1 | 12/2001 | Baur |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0067076 A1 | 6/2002 | Talbot |
| 2002/0087240 A1 | 7/2002 | Raithel |
| 2002/0091473 A1 | 7/2002 | Gardner |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1 | 9/2002 | Scaman |
| 2002/0138587 A1 | 9/2002 | Koehler |
| 2002/0163532 A1 | 11/2002 | Thomas |
| 2002/0169529 A1 | 11/2002 | Kim |
| 2002/0169530 A1 | 11/2002 | Laguer-Diaz |
| 2002/0183905 A1 | 12/2002 | Maeda |
| 2003/0016753 A1 | 1/2003 | Kim |
| 2003/0028298 A1 | 2/2003 | Macky |
| 2003/0053433 A1 | 3/2003 | Chun |
| 2003/0055557 A1 | 3/2003 | Dutta |
| 2003/0065805 A1 | 4/2003 | Barnes |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0112133 A1 | 6/2003 | Webb |
| 2003/0125854 A1 | 7/2003 | Kawasaki |
| 2003/0144775 A1 | 7/2003 | Klausner |
| 2003/0152145 A1 | 8/2003 | Kawakita |
| 2003/0154009 A1 | 8/2003 | Basir |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters et al. |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0064245 A1 | 4/2004 | Knockeart |
| 2004/0070926 A1 | 4/2004 | Boykin |
| 2004/0083041 A1 | 4/2004 | Skeen |
| 2004/0088090 A1 | 5/2004 | Wee |
| 2004/0103008 A1 | 5/2004 | Wahlbin |
| 2004/0103010 A1 | 5/2004 | Wahlbin |
| 2004/0104842 A1 | 6/2004 | Drury |
| 2004/0111189 A1 | 6/2004 | Miyazawa |
| 2004/0138794 A1 | 7/2004 | Saito |
| 2004/0145457 A1 | 7/2004 | Schofield et al. |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0203903 A1 | 10/2004 | Wilson |
| 2004/0209594 A1 | 10/2004 | Naboulsi |
| 2004/0210353 A1 | 10/2004 | Rice |
| 2004/0230345 A1 | 11/2004 | Tzamaloukas |
| 2004/0230370 A1 | 11/2004 | Tzamaloukas |
| 2004/0230373 A1 | 11/2004 | Tzamaloukas |
| 2004/0230374 A1 | 11/2004 | Tzamaloukas |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254689 A1 | 12/2004 | Blazic |
| 2004/0254698 A1 | 12/2004 | Hubbard |
| 2005/0021199 A1 | 1/2005 | Zimmerman |
| 2005/0043869 A1 | 2/2005 | Funkhouser |
| 2005/0060070 A1 | 3/2005 | Kapolka |
| 2005/0060071 A1 | 3/2005 | Winner |
| 2005/0065682 A1 | 3/2005 | Kapadia |
| 2005/0065716 A1 | 3/2005 | Timko |
| 2005/0073585 A1 | 4/2005 | Ettinger |
| 2005/0078423 A1 | 4/2005 | Kim |
| 2005/0088291 A1 | 4/2005 | Blanco |
| 2005/0099498 A1 | 5/2005 | Lao |
| 2005/0100329 A1 | 5/2005 | Lao |
| 2005/0102074 A1 | 5/2005 | Kolls |
| 2005/0125117 A1 | 6/2005 | Breed |
| 2005/0131585 A1 | 6/2005 | Luskin |
| 2005/0131595 A1 | 6/2005 | Luskin |
| 2005/0131597 A1 | 6/2005 | Raz |
| 2005/0136949 A1 | 6/2005 | Barnes |
| 2005/0137757 A1 | 6/2005 | Phelan |
| 2005/0137796 A1 | 6/2005 | Gumpinger |
| 2005/0146458 A1 | 7/2005 | Carmichael |
| 2005/0149238 A1 | 7/2005 | Stefani |
| 2005/0149259 A1 | 7/2005 | Cherveny |
| 2005/0159964 A1 | 7/2005 | Sonnenrein |
| 2005/0166258 A1 | 7/2005 | Vasilevsky |
| 2005/0171692 A1 | 8/2005 | Hamblen |
| 2005/0174217 A1 | 8/2005 | Basir |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Hoist |
| 2005/0200714 A1 | 9/2005 | Marchese |
| 2005/0203683 A1 | 9/2005 | Olsen |
| 2005/0206741 A1 | 9/2005 | Raber |
| 2005/0209776 A1 | 9/2005 | Ogino |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |

(56) References Cited

U.S. PATENT DOCUMENTS

| | | |
|---|---|---|
| 2005/0251304 A1 | 11/2005 | Cancellara |
| 2005/0256681 A1 | 11/2005 | Brinton |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0030986 A1 | 2/2006 | Peng |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0082438 A1 | 4/2006 | Bazakos |
| 2006/0092043 A1 | 5/2006 | Lagassey |
| 2006/0095175 A1 | 5/2006 | DeWaal |
| 2006/0095199 A1 | 5/2006 | Lagassey |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0129578 A1 | 6/2006 | Kim |
| 2006/0142913 A1 | 6/2006 | Coffee |
| 2006/0143435 A1 | 6/2006 | Kwon |
| 2006/0147187 A1 | 7/2006 | Takemoto |
| 2006/0161960 A1 | 7/2006 | Benoit |
| 2006/0168271 A1 | 7/2006 | Pabari |
| 2006/0178793 A1 | 8/2006 | Hecklinger |
| 2006/0180647 A1 | 8/2006 | Hansen |
| 2006/0184295 A1 | 8/2006 | Hawkins |
| 2006/0192658 A1 | 8/2006 | Yamamura |
| 2006/0200008 A1 | 9/2006 | Moore-Ede |
| 2006/0200305 A1 | 9/2006 | Sheha |
| 2006/0204059 A1 | 9/2006 | Ido |
| 2006/0209090 A1 | 9/2006 | Kelly et al. |
| 2006/0209840 A1 | 9/2006 | Paatela |
| 2006/0212195 A1 | 9/2006 | Veith |
| 2006/0215884 A1 | 9/2006 | Ota |
| 2006/0226344 A1 | 10/2006 | Werth |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1 | 11/2006 | Wu |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0035632 A1 | 2/2007 | Silvernail |
| 2007/0043487 A1 | 2/2007 | Krzystofczyk |
| 2007/0120948 A1 | 5/2007 | Fujioka |
| 2007/0124332 A1 | 5/2007 | Ballesty |
| 2007/0127833 A1 | 6/2007 | Singh |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0142986 A1 | 6/2007 | Alaous |
| 2007/0143499 A1 | 6/2007 | Chang |
| 2007/0150138 A1 | 6/2007 | Plante |
| 2007/0150140 A1 | 6/2007 | Seymour |
| 2007/0173994 A1 | 7/2007 | Kubo |
| 2007/0179691 A1 | 8/2007 | Grenn |
| 2007/0183635 A1 | 8/2007 | Weidhaas |
| 2007/0208494 A1 | 9/2007 | Chapman |
| 2007/0216521 A1 | 9/2007 | Guensler |
| 2007/0219685 A1 | 9/2007 | Plante |
| 2007/0219686 A1 | 9/2007 | Plante |
| 2007/0241874 A1* | 10/2007 | Okpysh ............ B60Q 1/444 340/479 |
| 2007/0244614 A1 | 10/2007 | Nathanson |
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0260677 A1 | 11/2007 | DeMarco |
| 2007/0263984 A1 | 11/2007 | Sterner |
| 2007/0268158 A1 | 11/2007 | Gunderson |
| 2007/0271105 A1 | 11/2007 | Gunderson |
| 2007/0273480 A1 | 11/2007 | Burkman |
| 2007/0279214 A1 | 12/2007 | Buehler |
| 2007/0299612 A1 | 12/2007 | Kimura |
| 2008/0035108 A1 | 2/2008 | Ancimer |
| 2008/0059019 A1 | 3/2008 | Delia |
| 2008/0071827 A1 | 3/2008 | Hengel |
| 2008/0111666 A1 | 5/2008 | Plante |
| 2008/0122603 A1 | 5/2008 | Plante |
| 2008/0143834 A1 | 6/2008 | Comeau |
| 2008/0147267 A1* | 6/2008 | Plante et al. ............... 701/35 |
| 2008/0157510 A1 | 7/2008 | Breed |
| 2008/0167775 A1 | 7/2008 | Kuttenberger |
| 2008/0169914 A1 | 7/2008 | Albertson |
| 2008/0177436 A1 | 7/2008 | Fortson |
| 2008/0195261 A1 | 8/2008 | Breed |
| 2008/0204556 A1 | 8/2008 | de Miranda |
| 2008/0211779 A1 | 9/2008 | Pryor |
| 2008/0234920 A1 | 9/2008 | Nurminen |
| 2008/0243389 A1 | 10/2008 | Inoue |
| 2008/0252412 A1 | 10/2008 | Larsson |
| 2008/0252485 A1 | 10/2008 | Lagassey |
| 2008/0252487 A1 | 10/2008 | McClellan |
| 2008/0269978 A1 | 10/2008 | Shirole |
| 2008/0281485 A1 | 11/2008 | Plante |
| 2008/0309762 A1 | 12/2008 | Howard et al. |
| 2008/0319604 A1 | 12/2008 | Follmer |
| 2009/0009321 A1 | 1/2009 | McClellan |
| 2009/0043500 A1 | 2/2009 | Satoh |
| 2009/0043971 A1 | 2/2009 | Kim |
| 2009/0051510 A1 | 2/2009 | Follmer |
| 2009/0138191 A1 | 5/2009 | Engelhard |
| 2009/0157255 A1 | 6/2009 | Plante |
| 2009/0216775 A1 | 8/2009 | Ratliff et al. |
| 2009/0224869 A1 | 9/2009 | Baker |
| 2009/0290848 A1 | 11/2009 | Brown |
| 2009/0299622 A1 | 12/2009 | Denaro |
| 2009/0312998 A1 | 12/2009 | Berckmans |
| 2009/0326796 A1 | 12/2009 | Prokhorov |
| 2009/0327856 A1 | 12/2009 | Mouilleseaux |
| 2010/0030423 A1 | 2/2010 | Nathanson |
| 2010/0045451 A1 | 2/2010 | Periwal |
| 2010/0049516 A1 | 2/2010 | Talwar |
| 2010/0054709 A1 | 3/2010 | Misawa |
| 2010/0057342 A1 | 3/2010 | Muramatsu |
| 2010/0063672 A1 | 3/2010 | Anderson |
| 2010/0063680 A1 | 3/2010 | Tolstedt |
| 2010/0063850 A1 | 3/2010 | Daniel |
| 2010/0070175 A1 | 3/2010 | Soulchin |
| 2010/0076621 A1 | 3/2010 | Kubotani |
| 2010/0085193 A1 | 4/2010 | Boss |
| 2010/0085430 A1 | 4/2010 | Kreiner |
| 2010/0087984 A1 | 4/2010 | Joseph |
| 2010/0100315 A1 | 4/2010 | Davidson |
| 2010/0103165 A1 | 4/2010 | Lee |
| 2010/0104199 A1 | 4/2010 | Zhang |
| 2010/0153146 A1 | 6/2010 | Angell |
| 2010/0157061 A1 | 6/2010 | Katsman |
| 2010/0191411 A1 | 7/2010 | Cook |
| 2010/0201875 A1 | 8/2010 | Rood |
| 2010/0220892 A1 | 9/2010 | Kawakubo |
| 2010/0250020 A1 | 9/2010 | Lee |
| 2010/0250021 A1 | 9/2010 | Cook |
| 2010/0250060 A1 | 9/2010 | Maeda |
| 2010/0250116 A1 | 9/2010 | Yamaguchi |
| 2010/0253918 A1 | 10/2010 | Seder |
| 2010/0268415 A1 | 10/2010 | Ishikawa |

(56) References Cited

U.S. PATENT DOCUMENTS

| | | |
|---|---|---|
| 2010/0283633 A1 | 11/2010 | Becker |
| 2010/0312464 A1 | 12/2010 | Fitzgerald |
| 2011/0035139 A1 | 2/2011 | Konlditslotis |
| 2011/0043624 A1 | 2/2011 | Haug |
| 2011/0060496 A1* | 3/2011 | Nielsen ............. G06Q 10/0631 701/31.4 |
| 2011/0077028 A1 | 3/2011 | Wilkes |
| 2011/0091079 A1 | 4/2011 | Yu-Song |
| 2011/0093159 A1 | 4/2011 | Boling |
| 2011/0112995 A1 | 5/2011 | Chang |
| 2011/0121960 A1 | 5/2011 | Tsai |
| 2011/0125365 A1 | 5/2011 | Larschan |
| 2011/0130916 A1 | 6/2011 | Mayer |
| 2011/0140884 A1 | 6/2011 | Santiago |
| 2011/0145042 A1 | 6/2011 | Green |
| 2011/0153367 A1 | 6/2011 | Amigo |
| 2011/0161116 A1 | 6/2011 | Peak |
| 2011/0166773 A1 | 7/2011 | Raz |
| 2011/0173015 A1 | 7/2011 | Chapman |
| 2011/0208428 A1 | 8/2011 | Matsubara |
| 2011/0212717 A1 | 9/2011 | Rhoads |
| 2011/0213628 A1 | 9/2011 | Peak |
| 2011/0224891 A1 | 9/2011 | Iwuchukwu |
| 2011/0251752 A1 | 10/2011 | DeLarocheliere |
| 2011/0251782 A1 | 10/2011 | Perkins |
| 2011/0254676 A1 | 10/2011 | Marumoto |
| 2011/0257882 A1 | 10/2011 | McBurney |
| 2011/0273568 A1 | 11/2011 | Lagassey |
| 2011/0283223 A1 | 11/2011 | Vattinen et al. |
| 2011/0304446 A1 | 12/2011 | Basson |
| 2012/0021386 A1* | 1/2012 | Anderson et al. ............. 434/66 |
| 2012/0035788 A1 | 2/2012 | Trepagnier |
| 2012/0041675 A1 | 2/2012 | Juliver |
| 2012/0046803 A1 | 2/2012 | Inou |
| 2012/0071140 A1 | 3/2012 | Oesterling |
| 2012/0078063 A1 | 3/2012 | Moore-Ede |
| 2012/0081567 A1 | 4/2012 | Cote |
| 2012/0100509 A1 | 4/2012 | Gunderson |
| 2012/0109447 A1 | 5/2012 | Yousefi |
| 2012/0123806 A1 | 5/2012 | Schumann |
| 2012/0134547 A1 | 5/2012 | Jung |
| 2012/0150436 A1 | 6/2012 | Rossano |
| 2012/0176234 A1 | 7/2012 | Taneyhill |
| 2012/0190001 A1 | 7/2012 | Knight |
| 2012/0198317 A1* | 8/2012 | Eppolito ............. G11B 27/034 715/202 |
| 2012/0210252 A1 | 8/2012 | Fedoseyeva |
| 2012/0277950 A1 | 11/2012 | Plante |
| 2012/0283895 A1 | 11/2012 | Noda |
| 2013/0004138 A1 | 1/2013 | Kilar |
| 2013/0006469 A1 | 1/2013 | Green |
| 2013/0021148 A1 | 1/2013 | Cook |
| 2013/0030660 A1 | 1/2013 | Fujimoto |
| 2013/0073114 A1 | 3/2013 | Nemat-Nasser |
| 2013/0096731 A1 | 4/2013 | Tamari |
| 2013/0145269 A1 | 6/2013 | Latulipe |
| 2013/0151980 A1 | 6/2013 | Lee |
| 2013/0197774 A1 | 8/2013 | Denson |
| 2013/0274950 A1 | 10/2013 | Richardson |
| 2013/0317711 A1 | 11/2013 | Plante |
| 2013/0332004 A1 | 12/2013 | Gompert et al. |
| 2013/0345927 A1 | 12/2013 | Cook |
| 2014/0025225 A1 | 1/2014 | Armitage |
| 2014/0025254 A1 | 1/2014 | Plante |
| 2014/0032062 A1 | 1/2014 | Baer |
| 2014/0046550 A1* | 2/2014 | Palmer ................. G08G 1/167 701/48 |
| 2014/0047371 A1* | 2/2014 | Palmer ................. G06F 3/0484 715/771 |
| 2014/0058583 A1* | 2/2014 | Kesavan ................ B62D 41/00 701/1 |
| 2014/0094992 A1* | 4/2014 | Lambert ................ G07C 5/008 701/1 |
| 2014/0098228 A1 | 4/2014 | Plante |
| 2014/0152828 A1 | 6/2014 | Plante |
| 2014/0226010 A1 | 8/2014 | Molin |
| 2014/0279707 A1 | 9/2014 | Joshua |
| 2014/0280204 A1 | 9/2014 | Avery |
| 2014/0300739 A1 | 10/2014 | Mimar |
| 2014/0309849 A1 | 10/2014 | Ricci |
| 2014/0335902 A1 | 11/2014 | Guba |
| 2014/0336916 A1 | 11/2014 | Yun |
| 2015/0035665 A1 | 2/2015 | Plante |
| 2015/0057836 A1 | 2/2015 | Plante |
| 2015/0112542 A1* | 4/2015 | Fuglewicz ........... G07C 5/0858 701/32.2 |
| 2015/0112545 A1* | 4/2015 | Binion .................. G07C 5/12 701/33.4 |
| 2015/0134226 A1 | 5/2015 | Palmer |
| 2015/0135240 A1 | 5/2015 | Shibuya |
| 2015/0189042 A1 | 7/2015 | Sun |
| 2015/0222449 A1 | 8/2015 | Salinger |
| 2015/0317846 A1 | 11/2015 | Plante |

FOREIGN PATENT DOCUMENTS

| | | |
|---|---|---|
| CA | 2692415 | 8/2011 |
| CA | 2692415 A1 | 8/2011 |
| DE | 20311262 | 9/2003 |
| DE | 202005008238 | 9/2005 |
| DE | 102004004669 | 12/2005 |
| EP | 0708427 A2 | 4/1996 |
| EP | 0840270 A2 | 5/1998 |
| EP | 0848270 A2 | 5/1998 |
| EP | 1170697 A2 | 1/2002 |
| EP | 1324274 A2 | 7/2003 |
| EP | 1355278 A1 | 10/2003 |
| EP | 1427165 A2 | 6/2004 |
| EP | 1818873 A1 | 8/2007 |
| EP | 2104075 | 9/2009 |
| EP | 2320387 | 5/2011 |
| EP | 2407943 | 1/2012 |
| GB | 2268608 A | 1/1994 |
| GB | 2402530 | 12/2004 |
| GB | 2402530 A | 12/2004 |
| GB | 2451485 | 2/2009 |
| GB | 2447184 B | 6/2011 |
| GB | 2446994 | 8/2011 |
| JP | 58085110 | 5/1983 |
| JP | S5885110 A | 5/1983 |
| JP | 62091092 | 4/1987 |
| JP | S6291092 A | 4/1987 |
| JP | S62166135 A | 7/1987 |
| JP | 02056197 | 2/1990 |
| JP | H0256197 A | 2/1990 |
| JP | H04257189 A | 9/1992 |
| JP | 5294188 | 11/1993 |
| JP | H09163357 A | 6/1997 |
| JP | H09272399 A | 10/1997 |
| JP | 10076880 | 3/1998 |
| JP | H1076880 A | 3/1998 |
| JP | 2002191017 | 7/2002 |
| KR | 1000588169 | 12/2000 |
| WO | 8809023 A1 | 11/1988 |
| WO | 9005076 | 5/1990 |
| WO | 9427844 | 12/1994 |
| WO | 9600957 A1 | 1/1996 |
| WO | 9701246 | 1/1997 |
| WO | 9726750 A1 | 7/1997 |
| WO | 9937503 | 7/1999 |
| WO | 9940545 A1 | 8/1999 |
| WO | 9962741 | 12/1999 |
| WO | 0007150 A1 | 2/2000 |
| WO | 0028410 A1 | 5/2000 |
| WO | 0048033 | 8/2000 |
| WO | 0077620 | 12/2000 |
| WO | 0123214 | 4/2001 |
| WO | 0125054 | 4/2001 |
| WO | 0146710 A2 | 6/2001 |
| WO | 03045514 | 6/2003 |
| WO | 2006022824 | 3/2006 |
| WO | 2006022824 A2 | 3/2006 |
| WO | 2007067767 | 6/2007 |
| WO | 2009081234 | 7/2009 |

(56) References Cited

FOREIGN PATENT DOCUMENTS

| WO | 2011055743 A1 | 5/2011 |
|---|---|---|
| WO | 2013072939 | 5/2013 |
| WO | 2013159853 | 10/2013 |

OTHER PUBLICATIONS

Amended Complaint for Patent Infringement, Trade Secret Misappropriation, Unfair Competition and Conversion in *DriveCam, Inc. v. SmartDrive Systems, Inc.*, Case No. 3:11-CV-00997-H-RBB, for the Southern District of California, Document 34, filed Oct. 20, 2011, pp. 1-15.
Amendment filed Dec. 23, 2009 during prosecution of U.S. Appl. No. 11/566,424.
Answer to Amended Complaint; Counterclaims; and Demand for Jury Trial in *DriveCam, Inc. v. SmartDrive Systems, Inc.*, Case No. 3:11-CV-00997 H (RBB), for the Southern District of California, Document 47, filed Dec. 13, 2011, pp. 1-15.
U.S. Appl. No. 11/296,906, filed Dec. 8, 2005, File History.
U.S. Appl. No. 11/297,669, filed Dec. 8, 2005, File History.
U.S. Appl. No. 11/297,889, filed Dec. 8, 2005, File History.
U.S. Appl. No. 11/298,069, filed Dec. 9, 2005, File History.
U.S. Appl. No. 11/299,028, filed Dec. 9, 2005, File History.
U.S. Appl. No. 11/593,659, filed Nov. 7, 2006, File History.
U.S. Appl. No. 11/593,682, filed Nov. 7, 2006, File History.
U.S. Appl. No. 11/593,882, filed Nov. 7, 2006, File History.
U.S. Appl. No. 11/595,015, filed Nov. 9, 2006, File History.
U.S. Appl. No. 11/637,754, filed Dec. 13, 2006, File History.
U.S. Appl. No. 11/637,755, filed Dec. 13, 2006, File History.
Bill. 'DriveCam—FAQ', Dec. 12, 2003.
Bill Siuru, 'DriveCam Could Save You Big Bucks', Land Line Magazine, May-Jun. 2000.
Chris Woodyard, 'Shuttles save with DriveCam', Dec. 9, 2003.
Dan Carr, Flash Video Template: Video Presentation with Navigation, Jan. 16, 2006, http://www.adobe.com/devnet/fiash/articles/vidtemplate_mediapreso_flash8.html.
David Cullen, 'Getting a real eyeful', Fleet Owner Magazine, Feb. 2002.
David Maher, 'DriveCam Brochure Folder', Jun. 6, 2005.
David Maher, "DriveCam Brochure Folder", Jun. 8, 2005.
David Vogeleer et al., Macromedia Flash Professional 8Unleashed (Sams Oct. 12, 2005).
Del Lisk, 'DriveCam Training Handout Ver4', Feb. 3, 2005.
Drivecam, Inc., User's Manual for Drivecam Video Systems' Hindsight 20/20 Software Version 4.0 (2003).
DriveCam, Inc.'s Infringement Contentions Exhibit A, U.S. Pat. No. 6,389,340, Document 34.1, Oct. 20, 2011.
DriveCam, Inc.'s Infringement Contentions Exhibit B, U.S. Pat. No. 7,804,426, Document 34.2, Oct. 20, 2011.
DriveCam, Inc.'s Infringement Contentions Exhibit C, U.S. Pat. No. 7,659,827, Document 34.3, Oct. 20, 2011.
DriveCam, Inc.'s Infringement Contentions Exhibit D, Document 34.4, Oct. 20, 2011.
DriveCam—Illuminator Data Sheet, Oct. 2, 2004.
DriveCam Driving Feedback System, Mar. 15, 2004.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 3, 2012, pp. 86-103.
Franke, U., et al., Autonomous Driving Goes Downtown, IEEE Intelligent Systems, 13(6):40-48 (1988); Digital Object Identifier 10.1109/5254.736001.

Gallagher, B., et al., Wireless Communications for Vehicle Safety: Radio Link Performance and Wireless Connectivity Methods, Vehicular Technology Magazine, IEEE, 1(4):4-24 (2006); Digital Object Identifier 10.1109/MVT.2006.343641.
Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001.
GE published its VCR User's Guide for Model VG4255 in 1995.
Glenn Oster, 'Hindsight 20/20 v4.0 Software Installation', 1 of 2, Jun. 20, 2003.
Glenn Oster, 'HindSight 20/20 v4.0 Software Installation', 2 of 2, Jun. 20, 2003.
Glenn Oster, 'Illuminator Installation', Oct. 3, 2004.
I/O Port Racing Supplies' website discloses using Traqmate's Data Acquisition with Video Overlay system in conjunction with professional driver coaching sessions (available at http://www.ioportracing.com/Merchant2/ merchant.mvc?Screen=CTGY &Categorys- ub.--Code=coaching)., printed from site on Jan. 11, 2012.
International Search Report and Written Opinion issued in PCT/US07/68325 on Feb. 27, 2008.
International Search Report and Written Opinion issued in PCT/US07/68328 on Oct. 15, 2007.
International Search Report and Written Opinion issued in PCT/US07/68329 on Mar. 3, 2008.
International Search Report and Written Opinion issued in PCT/US07/68332 on Mar. 3, 2008.
International Search Report and Written Opinion issued in PCT/US07/68334 on Mar. 5, 2008.
International Search Report for PCT/US2006/47055, Mailed Mar. 20, 2008 (2 pages).
International Search Report issued in PCT/US2006/47042 mailed Feb. 25, 2008.
J. Gallagher, 'Lancer Recommends Tech Tool', Insurance and Technology Magazine, Feb. 2002.
Jessyca Wallace, 'Analyzing and Processing DriveCam Recorded Events', Oct. 6, 2003.
Jessyca Wallace, 'Overview of the DriveCam Program', Dec. 15, 2005.
Jessyca Wallace, 'The DriveCam Driver Feedback System', Apr. 6, 2004.
Joint Claim Construction Chart, U.S. Pat. No. 6,389,340, 'Vehicle Data Recorder' for Case No. 3:11-CV-00997-H-RBB, Document 43-1, filed Dec. 1, 2011, pp. 1-33.
Joint Claim Construction Chart in *DriveCam, Inc. v. SmartDrive Systems, Inc.*, Case No. 11-CV-0997-H (RBB), for the Southern District of California, Document 43, filed Dec. 1, 2011, pp. 1-2.
Joint Claim Construction Worksheet, U.S. Pat. No. 6,389,340, 'Vehicle Data Reporter' for Case No. 3:11-CV-00997-H-RBB, Document 44-1, filed Dec. 1, 2011, pp. 1-10.
Joint Claim Construction Worksheet in *DriveCam, Inc. v. SmartDrive Systems, Inc.*, Case No. 3:11-CV-00997 H (RBB), for the Southern District of California, Document 44, filed Dec. 1, 2011, pp. 1-2.
Joint Motion for Leave to Supplement Disclosure of Asserted Claims and Preliminary Infringement Contentions in *DriveCam, Inc. v. SmartDrive Systems, Inc.*, Case No. 3:11-cv-00997-H-RBB, Document 29, filed Oct. 12, 2011, pp. 1-7.
Julie Stevens, 'DriveCam Services', Nov. 15, 2004.
Julie Stevens, 'Program Support Roll-Out & Monitoring', Jul. 13, 2004.
Jung, Sang-Hack, et al., Egomotion Estimation in Monocular Infrared Image Sequence for Night Vision Applications, IEEE Workshop on Applications of Computer Vision (WACV '7), Feb. 2007, pp. 8-8; Digital Object Identifier 10.1109/WACV.2007.20.
JVC Company of America, JVC Video Cassette Recorder HR-IP820U Instructions (1996).

(56) References Cited

OTHER PUBLICATIONS

Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.
Karen, 'Downloading Options to HindSight 20120', Aug. 6, 2002.
Karen, 'Managers Guide to the DriveCam Driving Feedback System', Jul. 30, 2002.
Kathy Latus (Latus Design), 'Case Study—Cloud 9 Shuttle', Sep. 23, 2005.
Kathy Latus (Latus Design), 'Case Study—Lloyd Pest Control', Jul. 19, 2005.
Kathy Latus (Latus Design), 'Case Study—Time Warner Cable', Sep. 23, 2005.
Ki, Yong-Kul, et al., A Traffic Accident Detection Model using Metadata Registry, Proceedings of the Fourth International Conference on Software Engineering Research, Management and Applications; Aug. 9-11, 2006 pp. 255-259 Digital Object Identifier 10.1109/SERA.2006.8.
Kitchin, Charles. "Understanding accelerometer scale factor and offset adjustments." Analog Devices (1995).
Lin, Chin-Teng et al., EEG-based drowsiness estimation for safety driving using independent component analysis; IEEE Transactions on Circuits and Systems-I: Regular Papers, 52(12):2726-2738 (2005); Digital Object Identifier 10.1109/TCSI.2005.857555.
Lisa McKenna, 'A Fly on the Windshield?', Pest Control Technology Magazine, Apr. 2003.
Miller, D.P., Evaluation of Vision Systems for Teleoperated Land Vehicles. Control Systems Magazine, IEEE, 8(3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS.2008.922943.
Panasonic Corporation, Video Cassette Recorder (VCR) Operating Instructions for Models No. PV-V4020/PV-V4520.
Passenger Transportation Mode Brochure, May 2, 2005.
Patent Abstracts of Japan vol. 007, No. 180 (P-215), Aug. 9, 1983 & JP 58 085110 A (Mitsuhisa Ichikawa), May 21, 1983.
Patent Abstracts of Japan vol. 011, No. 292 (E-543), Sep. 19, 1987 & JP 62 091092 A (OK ENG:KK), Apr. 25, 1987.
Patent Abstracts of Japan vol. 012, No. 001 (M-656), Jan. 6, 1988 & JP 62 166135 A (Fuji Electric Co Ltd), Jul. 22, 1987.
Patent Abstracts of Japan vol. 014, No. 222 (E-0926), May 10, 1990 & JP 02 056197 A (Sanyo Electric Co Ltd), Feb. 26, 1990.
Patent Abstracts of Japan vol. 017, No. 039 (E-1311), Jan. 25, 1993 & JP 04 257189 A (Sony Corp), Sep. 11, 1992.
Patent Abstracts of Japan vol. 1997, No. 10, Oct. 31, 1997 & JP 09 163357 A (Nippon Soken Inc), Jun. 20, 1997.
Patent Abstracts of Japan vol. 1998, No. 02, Jan. 30, 1998 & JP 09 272399 A (Nippon Soken Inc), Oct. 21, 1997.
Patent Abstracts of Japan vol. 1998, No. 8, Jun. 30, 1998 & JP 10 076880 A (Muakami Corp), Mar. 24, 1998.
PCT/US2010/022012, Invitation to Pay Additional Fees with Communication of Partial International Search, Jul. 21, 2010.
Quinn Maughan, 'DriveCam Enterprise Services', Jan. 5, 2006.
Quinn Maughan, 'DriveCam Managed Services', Jan. 5, 2006.
Quinn Maughan, 'DriveCam Standard Edition', Jan. 5, 2006.
Quinn Maughan, 'DriveCam Unit Installation', Jul. 21, 2005.
Quinn Maughan, 'Enterprise Services', Apr. 17, 2006.
Quinn Maughan, 'Enterprise Services', Apr. 7, 2006.
Quinn Maughan, 'Hindsight Installation Guide', Sep. 29, 2005.
Quinn Maughan, 'Hindsight Users Guide', Jun. 7, 2005.
Ronnie Rittenberry, 'Eyes on the Road', Jul. 2004.
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012.
U.S. Appl. No. 12/691,639, entitled 'Driver Risk Assessment System and Method Employing Selectively Automatic Event Scoring', filed Jan. 21, 2010.
U.S. Appl. No. 11/377,167, Final Office Action dated Nov. 8, 2013.
U.S. Appl. No. 11/377,157, filed Mar. 16, 2006 entitled, "Vehicle Event Recorder Systems and Networks Having Parallel Communications Links".
U.S. Appl. No. 11/377,167, filed Mar. 16, 2006 entitled, "Vehicle Event Recorder Systems and Networks Having Integrated Cellular Wireless Communications Systems".
USPTO Final Office Action for U.S. Appl. No. 11/297,669, mailed Nov. 7, 2011, 15 pages.
USPTO Final Office Action for U.S. Appl. No. 13/957,810, mailed Jun. 27, 2014, 24 pages.
USPTO Non-Final Office Action for U.S. Appl. No. 11/296,906, mailed Apr. 2, 2009, 7 pages.
USPTO Non-Final Office Action for U.S. Appl. No. 11/296,906, mailed Nov. 6, 2009, 9 pages.
USPTO Non-Final Office Action for U.S. Appl. No. 11/297,669, mailed Apr. 28, 2011, 11 pages.
USPTO Non-Final Office Action for U.S. Appl. No. 11/299,028, mailed Apr. 24, 2008, 9 pages.
USPTO Non-Final Office Action for U.S. Appl. No. 11/377,164, mailed Nov. 19, 2007, 7 pages.
USPTO Non-Final Office Action for U.S. Appl. No. 11/377,164, mailed Nov. 25, 2011, 9 pages.
USPTO Non-Final Office Action for U.S. Appl. No. 11/377,164, mailed Sep. 11, 2008, 8 pages.
USPTO Non-Final Office Action for U.S. Appl. No. 11/377,167, mailed Jun. 5, 2008, 11 pages.
USPTO Non-Final Office Action for U.S. Appl. No. 11/800,876, mailed Dec. 1, 2010, 12 pages.
USPTO Non-Final Office Action for U.S. Appl. No. 11/800,876, mailed Dec. 20, 2011, 8 pages.
USPTO Non-Final Office Action for U.S. Appl. No. 12/096,591, mailed May 20, 2014, 19 pages.
USPTO Non-Final Office Action for U.S. Appl. No. 11/296,907, Mailed Mar. 22, 2007 ( 17 pages).
USPTO Non-final Office Action mailed Aug. 27, 2009 during prosecution of U.S. Appl. No. 11/566,424.
USPTO Non-Final Office Action mailed Nov. 27, 2013 in U.S. Appl. No. 13/957,810, filed Aug. 2, 2013.
Veeraraghavan, H., et al., Computer Vision Algorithms for Intersection Monitoring, IEEE Transactions on Intelligent Transportation Systems, 4(2):78-89 (2003); Digital Object Identifier 10.1109/TITS.2003.821212.
Wijesoma, W.S., et al., Road Curb Tracking in an Urban Environment, Proceedings of the Sixth International Conference of Information Fusion, 1:261-268 (2003).
Inovate Motorsports, OT-1 16 Channel OBD-II Interface User Manual, Version 1.0, Nov. 28, 2007, pp. 3, 4, 21 & 27.
Trivinci Systems, LLC, Race-Keeper Systems User Guide, Jan. 2011, v1, 1.02, pp. 34 and 39.
USPTO Non-Final Office Action for U.S. Appl. No. 14/036,299, mailed Aug. 12, 2014.
DriveCam, Inc.'s Infringement Contentions Exhibit B, U.S. Pat. No. 7,659,827. Aug. 19, 2011. (29 pgs.).
DriveCam, Inc.'s Infringement Contentions Exhibit C, U.S. Pat. No. 7,804,426. Aug. 19, 2011. (47 pgs.).
DriveCam's Disclosure of Asserted Claims and Preliminary Infringement Contentions in *DriveCam, Inc.* v. *SmartDrive Systems, Inc.*, Case No. 3:11-CV-00997-H-RBB, for the Southern District of California. Aug. 19, 2011. (6 pgs.).
Preliminary Claim Construction and Identification of Extrinsic Evidence of Defendant/Counterclaimant SmartDriveSystems, Inc. in *DriveCam, Inc.* v. *SmartDrive Systems, Inc.*, Case No. 3:11-CV-00997-H (RBB), for the Southern District of California. Nov. 8, 2011. (13 pgs.).
Supplement to DriveCam's Disclosure of Asserted Claims and Preliminary Infringement Contentions in *DriveCam, Inc.* v.

(56) References Cited

OTHER PUBLICATIONS

*SmartDrive Systems, Inc.*, Case No. 3:11-CV-00997-H-RBB, for the Southern District of California. Oct. 14, 2011. (7 pgs.).
"DriveCam, Inc's Disclosure of Proposed Constructions and Extrinsic Evidence Pursuant to Patent L.R. 4.1.a & 4.1.b" Disclosure and Extrinsic Evidence in *DriveCam, Inc. v. SmartDrive Systems, Inc.*, Case No. 3:11-CV-00997-H-RBB, for the Southern District of California. Nov. 8, 2011, 68 pages.
"DriveCam Driving Feedback System", DriveCam brochure, Jun. 12, 2001, Document #6600128, 2 pages.
"DriveCam Driving Feedback System" DriveCam brochure, Mar. 15, 2004, 4 pages.
"DriveCam Passenger Transportation Module", DriveCam brochure, Oct. 26, 2001, 2 pages.
"DriveCam Video Event Data Recorder", DriveCam brochure, Nov. 6, 2002, Document #6600127, 2 pages.
"Responsive Claim Construction and Identification of Extrinsic Evidence of Defendant/Counterclaimant SmartDrive Systems, Inc." Claim Construction and and Extrinsic Evidence in *DriveCam, Inc. v. SmartDrive Systems, Inc.*, Case No. 3:11-CV-00997-H (RBB), for the Southern District of California. Nov. 15, 2011, 20 pages.
"Sonic MyDVD 4.0: Tutorial: Trimming video segments". Tutorial for software bundled with Adaptec VideoOh! DVD USB 2.0 Edition, 2003, 13 pages.
"User's Manual for DriveCam Video Systems' HindSight 20/20 Software Version 4.0" DriveCam Manual, San Diego, 2003, Document #6600141-1, 54 pages.
Canadian Office Action issued in Application No. 2,632,685 dated Jan. 30, 2015; 5 pages.
Dan Maher, "DriveCam Taking Risk Out of Driving", DriveCam brochure folder, Jun. 6, 2005, 6 pages.
Del Lisk, "DriveCam Training Seminar" Handout, 2004, 16 pages.
European Examination Report issued in EP 07772812.9 on Jan. 22, 2015; 5 pages.
Jean (DriveCam vendor) "DriveCam Driving Feedback System", DriveCam brochure, Nov. 6, 2002, Document #6600128-1, 2 pages.
Notice of Allowance Allowance for U.S. Appl. No. 14/036,299, mailed Mar. 20, 2015, 5 pages.
Notice of Allowance Application for U.S. Appl. No. 11/566,424, mailed Feb. 26, 2010, 6 pages.
Notice of Allowance for U.S. Appl. No. 11/377,164, mailed Dec. 3, 2014, 5 pages.
Notice of Allowance for U.S. Appl. No. 11/377,164, mailed Feb. 13, 2015, 2 pages.
Notice of Allowance for U.S. Appl. No. 11/377,164, mailed Feb. 25, 2014, 2 pages.
Notice of Allowance for U.S. Appl. No. 11/377,164, mailed Nov. 18, 2013, 7 pages.
Notice of Allowance for U.S. Appl. No. 11/377,167, mailed Apr. 1, 2015, 7 pages.
Notice of Allowance for U.S. Appl. No. 11/800,876, mailed Apr. 19, 2012, 8 pages.
Notice of Allowance for U.S. Appl. No. 13/957,810, mailed Jun. 8, 2015, 10 pages.
USPTO Final Office Action for U.S. Appl. No. 11/296,906, mailed Aug. 8, 2012, 15 pages.
USPTO Final Office Action for U.S. Appl. No. 12/096,591, mailed Dec. 5, 2014, 23 pages.
USPTO Final Office Action for U.S. Appl. No. 12/096,591, mailed Jul. 18, 2012, 15 pages.
USPTO Final Office Action for U.S. Appl. No. 12/096,591, mailed Nov. 7, 2013, 14 pages.
USPTO Final Office Action for U.S. Appl. No. 13/957,810, mailed Jun. 27, 2014, 22 pages.
USPTO Final Office Action for U.S. Appl. No. 14/036,299, mailed Feb. 24, 2015, 9 pages.
USPTO Non-Final Office Action for U.S. Appl. No. 11/296,906, mailed Apr. 8, 2014, 19 pages.
USPTO Non-Final Office Action for U.S. Appl. No. 11/296,906, mailed Jun. 12, 2012, 13 pages.
USPTO Non-Final Office Action for U.S. Appl. No. 11/377,164, mailed Apr. 7, 2014, 7 pages.
USPTO Non-Final Office Action for U.S. Appl. No. 11/377,164, mailed Aug. 18, 2014, 5 pages.
USPTO Non-Final Office Action for U.S. Appl. No. 11/377,164, mailed Sep. 10, 2012, 10 pages.
USPTO Non-Final Office Action for U.S. Appl. No. 11/377,167, mailed Jun. 27, 2013, 11 pages.
USPTO Non-Final Office Action for U.S. Appl. No. 12/096,591, mailed Jun. 14, 2011, 8 pages.
USPTO Non-Final Office Action for U.S. Appl. No. 12/096,591, mailed Mar. 27, 2013, 16 pages.
USPTO Non-Final Office Action for U.S. Appl. No. 13/957,810, mailed Apr. 17, 2015, 6 pages.
USPTO Non-final Office Action for U.S. Appl. No. 13/957,810, mailed Nov. 27, 2013, 18 pages.
USPTO Non-Final Office Action mailed Jan. 4, 2016 in U.S. Appl. No. 14/529,134, filed Oct. 30, 2014 (65 pgs).
PCT International Search Report and Written Opinion for PCT/US15/60721 dated Feb. 26, 2016, 11 pages.
Trivinci Systems, LLC, "Race-Keeper System User Guide", V1 .1.02, Jan. 2011, p. 21.
PCT International Search Report and Written Opinion for PCT/IB16/51863, dated Sep. 16, 2016.

\* cited by examiner

VEHICLE EVENT PLAYBACK APPARATUS AND METHODS

FIELD

The following invention disclosure is generally concerned with multi-media playback systems and specifically concerned with playback systems for vehicle event record playback and analysis.

BACKGROUND

Multi-media players are known. Multi-media players are designed to run on computer systems and play back electronic audio and video files of specific types. The multi-media players typically include user interfaces for users to control playback. For example, a user may control 'Windows Media Player®' to play video encoded media files consistent with a format defined in the MP4 standard.

In some multi-media players the user interface controls are customized based on a user's internet browsing habits, computer system characteristics, and network authentication information. In some multi-media players, a user may control the visual appearance of the information displayed to the user.

SUMMARY

One aspect of the disclosure relates to vehicle event record playback systems including devices and methods. It is a primary function of these systems to provide review and analysis means suited and arranged in view of information captured by vehicle event recorders, active safety systems, and/or other systems installed in and/or coupled to a vehicle. In contrast to the prior art, systems presented here do not suffer limitations which prevent their use for synchronized display of data captured by vehicle event recorders, active safety systems, and/or other systems.

Vehicle event recorders may produce event record datasets in response to anomalies and/or other events detected during vehicle operation. Active safety systems may alert a vehicle driver to potentially dangerous conditions detected in and/or around a vehicle during operation of the vehicle. Because event record datasets and/or information generated by the active safety system may contain considerable amounts of data in many data formats and arrangements, they may be difficult to parse, read, interpret, and/or use. In known systems, some vehicle event recorder and/or active safety system data was manually reviewed and certain data subsets of greatest importance were manually developed from raw data into visual presentations by way of standard software such as spreadsheet plotting utilities.

Vehicle event data playback systems described herein may include advanced playback of vehicle event recorder data, active safety system data, vehicle subsystem data and/or other data. The playback of the vehicle event recorder data, the active safety system data, the vehicle subsystem data, and/or other data may be in real time, and/or may be played back at a later time. The playback of the vehicle event recorder data may be played back via a user interface located in the vehicle, a remotely located user interface, a remotely located computing device, and/or via other systems. These systems may include visual devices arranged to express vehicle performance data in graphical, image and/or alphanumeric forms. These systems may be arranged to present data in logical arrangements whereby many different types of datasets collected at various vehicle sensors may be presented in time synchronized schemes along with a plurality of complementary data. Data presented in this fashion may permit greater analysis and may enable reviewers to devise coaching feedback, for example.

In a first example, vehicle performance data may be collected by way of a vehicle's onboard electronic control unit (ECU). The ECU may include an engine control module (ECM), for example. The data from the ECU may be included in, and/or associated with other data collected at the same (or nearly same) instant in time from other sources such as data from aftermarket sensors (e.g., an accelerometer) coupled with the vehicle, data from an active safety system installed in and/or coupled with the vehicle, and/or data from other sources that generate information relevant to vehicle operation. An event record may be prepared in a manner where at least some data measurements are associated with a timestamp or other time synchronization scheme. In this way, synchronized playback of data from a plurality of data sources may be enabled.

On playback, a human reviewer may be presented with simultaneous views and expressions of multiple data elements. The individual data elements may be presented in a visual nature on a common display field of a graphical user interface (GUI). Since these data elements often have a high level of interdependence, simultaneous expression of their instantaneous values in a time sequenced series playback enables may enhance vehicle event record review.

Graphical user interfaces of these systems may include control objects. The control objects may be responsive to data values of vehicle event record datasets. The control objects may be expressed visually. A control object may be a visual element in the graphical user interface that is associated with data and/or a data stream from one or more sensors. Control objects may include parametric input couplings, data interfaces, underlying logic code which defines performance, a visual expression, an event set, triggers, an instantaneous state, and/or other control objects. Combinations of various related control objects may operate together in synchronization to characterize and/or describe actions and/or states associated with a vehicle and its many subsystems during a recorded event.

The control objects may be arranged to visually express data collected from vehicle subsystems in graphical and/or alphanumeric forms. In some implementations, the control objects may visually express data associated with standard ECU systems, an active safety system, a vehicle event recorder, and/or other systems, and present that data in one or more visual forms in conjunction with simultaneous playback of related video, for example.

The control objects of the graphical user interface may be coupled to an event timeline whereby presentation of data by the control objects conforms to the event timing. An event timeline may have a start-time, an end-time, and/or a continuous period of time therebetween. An event record dataset may include an event timeline definition for events recorded at a vehicle event recorder. For example, the controls presented by the GUI may be connected to a single timeline and that timeline may be coupled to the event time.

In some implementations of these systems, 'video playback' may be an included feature. Accordingly, video players may generally be included as a primary element of these graphical user interfaces. Video player systems of these devices may include those suitable for playback of common video captured at a vehicle event recorder video camera. These video players may also be suitable for playback of virtual video. Virtual video may include image series playback where the images are from sources other than a vehicle event recorder. These may include forward and aft video camera views, street view image series, mapview image series, and even bird's eye view playback. Video playback may be synchronized with the ECU data, active safety system data, and/or vehicle event recorder data, for example.

Other control objects found in the playback apparatus may include graphical representations of acceleration data in one or more coupled controls. One feature may relate to a notation facility which may be coupled to an event timeline. The notation facility permits replay of manually prepared notes to which a time Association has been made and assigned in synchronization with event replay.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

These and other features, aspects, and advantages of the present invention will become better understood with regard to the following description, appended claims and drawings where:

DETAILED DESCRIPTION

Figure 1A:
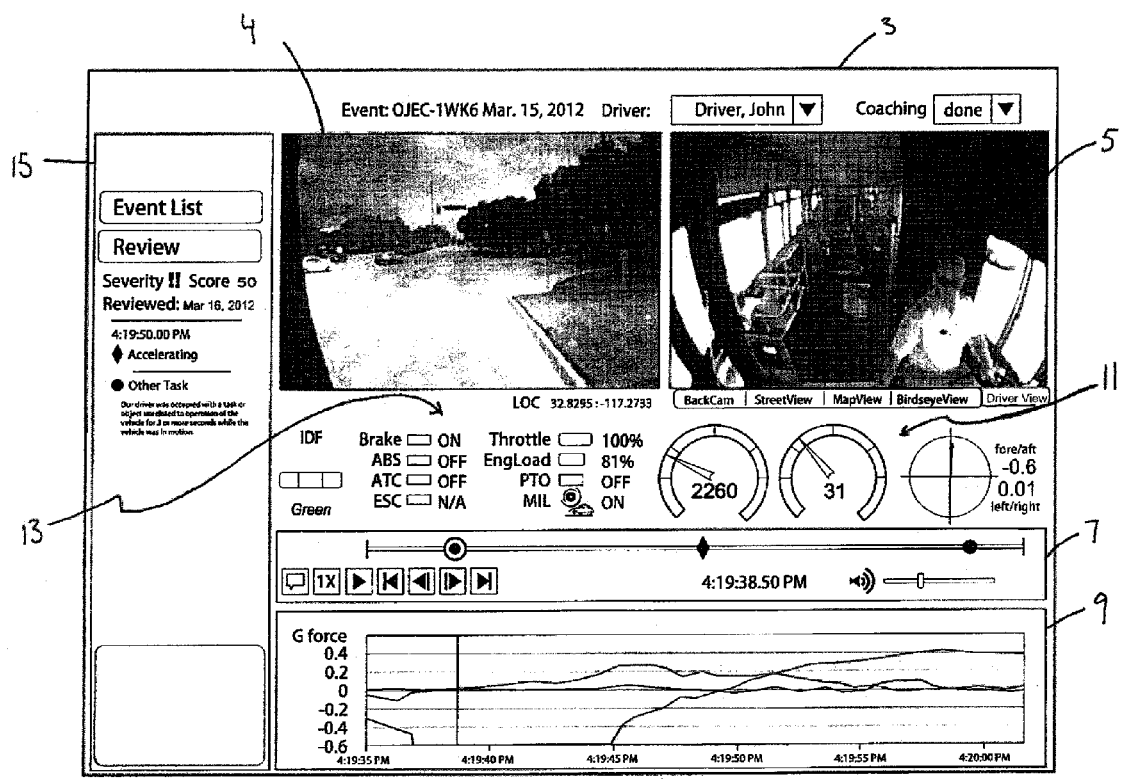
FIGS. 1A-1G illustrate examples of a view of a graphical user interface which illustrates a version of these systems.
Figure 1B:
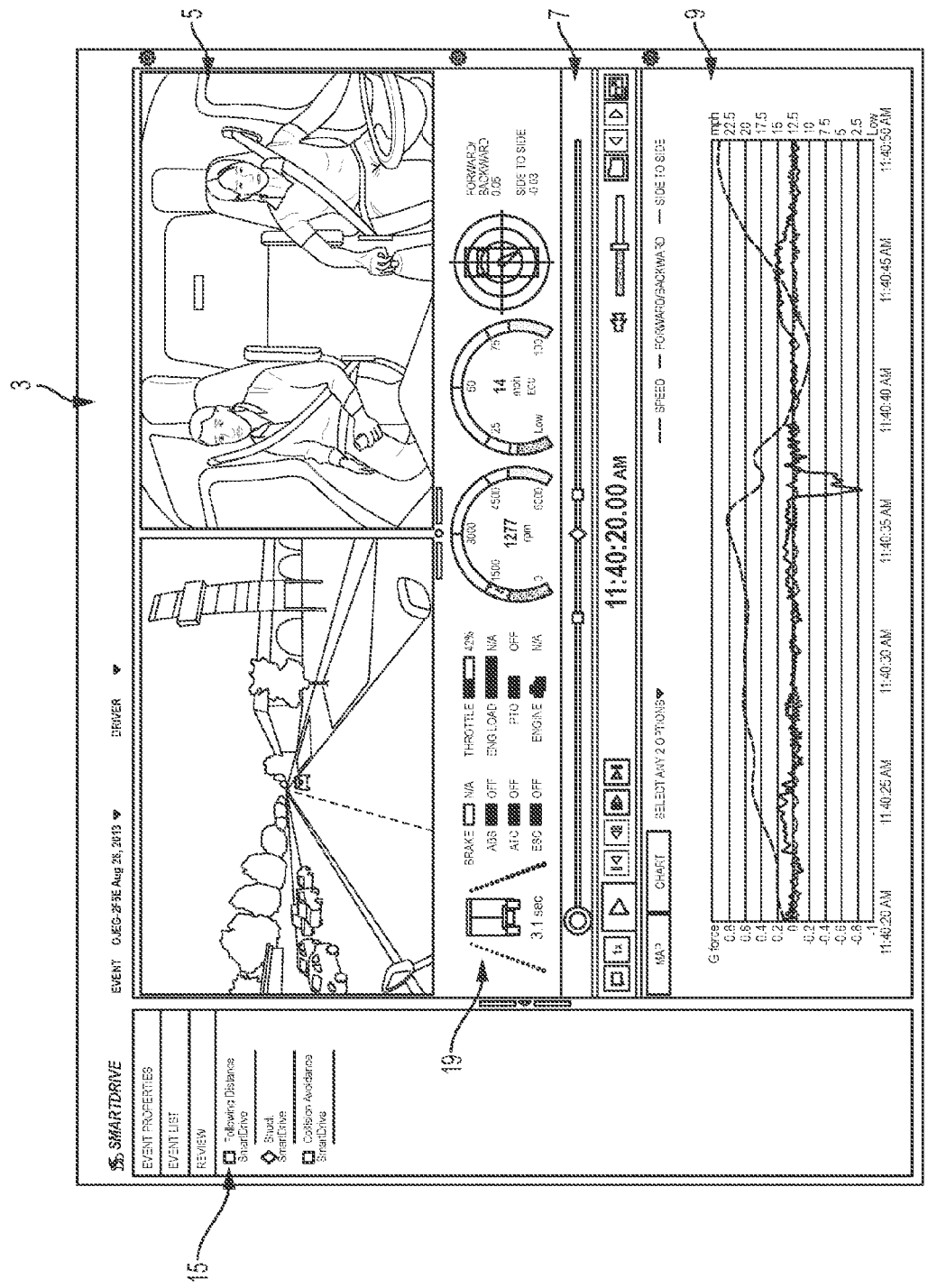
Figure 1C:
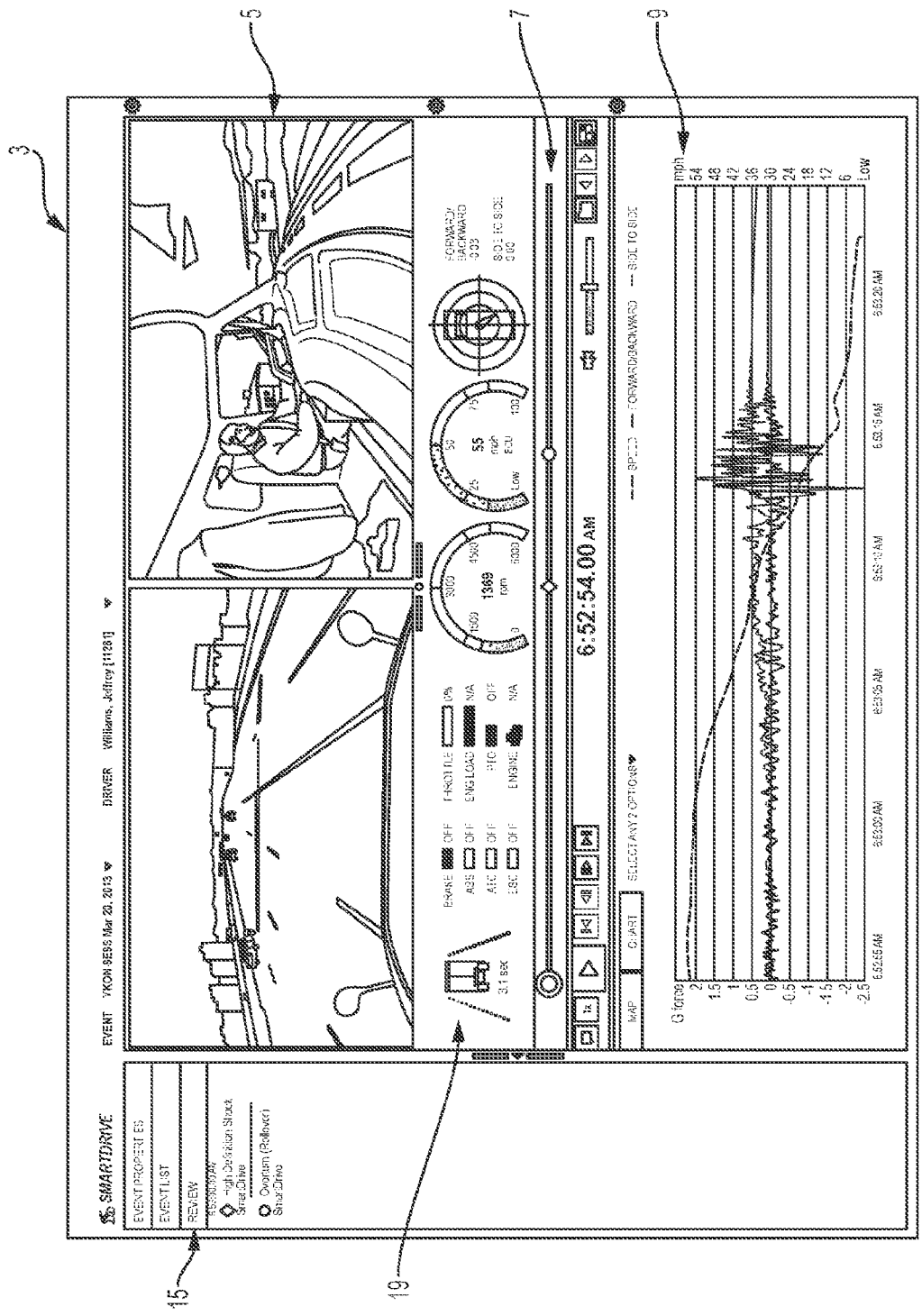
Figure 1D:
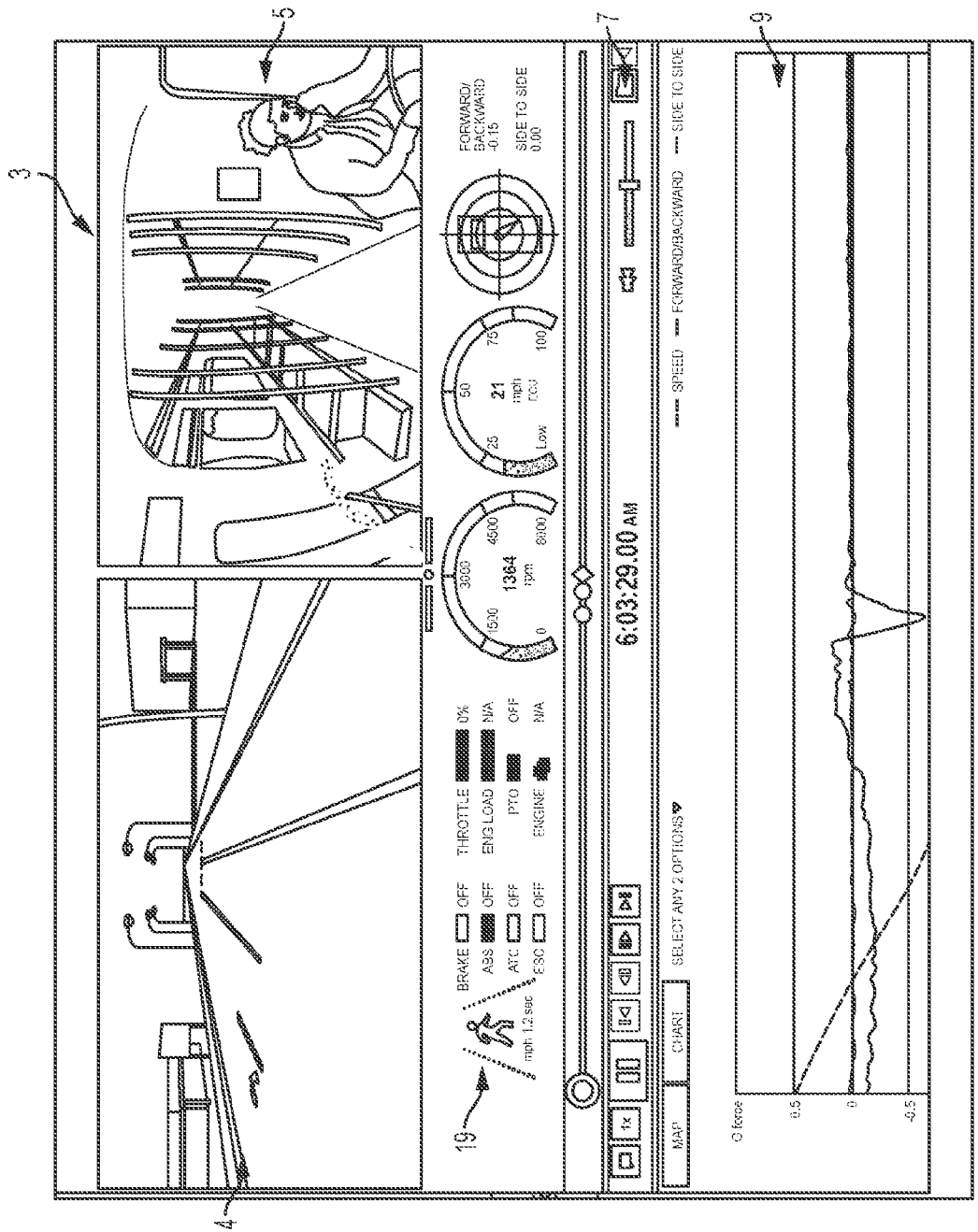

FIGS. 1A-1G illustrate various views 3 of a graphical user interface included in and/or associated with a vehicle event data playback apparatus. The graphical user interface and/or the vehicle event data playback apparatus described herein may be configured to visually present a user with information related to operation of a vehicle. In some implementations, the user may review the information related to operation of the vehicle in real time, responsive to the vehicle being involved in a vehicle event, responsive to an active safety system alert, and/or at other times. The vehicle event may include an active safety system alert (e.g., events on the vehicle bus that indicate activations of active safety system), an accident, a specific driving maneuver, vehicle speed exceeding a set threshold or the posted speed limit, a narrowly avoided accident where a driver braked hard and/or swerved, trigger activations from external systems, a driver pressing a button (an/or gesturing via some other interface) designed to indicate an event, and/or other events. Specific driving maneuvers and/or active safety system alerts may be related to swerving, a U-turn, freewheeling, over-revving, short following (e.g. tailgating), a pedestrian detection and/or collision warning, driving in reverse, vehicle rollover, antilock braking, a forward collision warning, a lane departure warning, other events and/or maneuvers.

In some implementations, an active safety system may be installed in the vehicle at manufacture. In some implementations, the active safety system may be an aftermarket system installed in and/or coupled with the vehicle. The active safety system may be configured to detect and/or alert a vehicle driver to dangerous and/or other driving conditions. An active safety system alert may cause the driver to take action to prevent and/or lessen the severity of collisions, for example, and/or other undesired events. The active safety system may include one or more sensors, one or more processors, a user interface, and/or other components. The one or more active safety system sensors may be configured to generate output signals conveying information related to vehicle safety and/or other information. The one or more processors may be configured to detect unsafe conditions during operation of the vehicle based on the output signals from the active safety system sensors, and/or other sources of information. The one or more processors may be configured to generate one or more alerts responsive to detection of unsafe conditions. The active safety system may be manufactured by one or more manufacturers including, for example, Meritor-Wabco, Bendix, Mobileye and/or other active safety system manufacturers.

The vehicle event data playback apparatus visually presents information that is generated based on output signals from one or more sensors associated with the vehicle. The vehicle event data playback apparatus may synchronize the presented information such that information from individual sensors may be compared and/or viewed at the same time by the user. The information from individual sensors may be compared and/or viewed at the same time by the user at one or more time points before, during, and/or after a vehicle event, an active safety system alert, and/or at other times.

The sensors may be configured to generate output signals conveying information related to the operation and/or the context of the vehicle. The sensors may be configured to generate output signals conveying information related to one or more operating parameters of the vehicle. Information related to the operation of the vehicle, the context of the vehicle, and/or operating parameters of the vehicle may include vehicle safety information, vehicle event information, vehicle environment information, vehicle subsystem information, and/or other information. Information related to the operation of the vehicle, the context of the vehicle, and/or operating parameters of the vehicle may include feedback information from one or more of the mechanical systems of the vehicle, and/or other information. In some implementations, at least one of the sensors may be an active safety system sensor. In some implementations, at least one of the sensors may be a vehicle system sensor associated with an ECU system of the vehicle. Information related to the context of the vehicle may include information related to the environment in and/or around vehicle. In some implementations, the output signals conveying the information related to the context of the vehicle may be generated via non-standard aftermarket sensors installed in the vehicle as part of a vehicle event recorder, for example. The non-standard aftermarket sensors may include, for example, a video camera, an accelerometer, a gyroscope, a geolocation sensor (e.g., a GPS device), a radar detector, an audio sensor (e.g., a microphone), and/or other sensors.

The vehicle event playback apparatus may include and/or communicate with the vehicle event recorder. The vehicle event recorder may be configured to record data associated with vehicle events. The vehicle events may be triggered to be recorded based on the information generated by the active safety system (e.g., the active safety system sensors and/or the active safety system processor(s)), the information from the non-standard aftermarket sensors installed in the vehicle, the information from the vehicle system sensors associated with an ECU system of the vehicle, pre-determined vehicle event profiles, and/or other information. In some implementations, the vehicle event recorder may be triggered to record the vehicle events based on a trigger, for example. A trigger may include and/or result from a comparison of the information conveyed by the output signals from the sensors to criteria included in the pre-determined vehicle event profiles. A trigger may be one or more logical criteria that is determined to have been met by the system. The vehicle event recorder may be configured to obtain one or more pre-determined vehicle event profiles. The one or more pre-determined vehicle event profiles may include criteria sets associated with the vehicle events. A specific vehicle event may be triggered to be recorded based on the information conveyed by the output signals and the obtained pre-determined vehicle event profiles by comparing the information conveyed by the output signals (and/or information determined based on the output signals) to the criteria sets such that a specific vehicle event is triggered to be recorded responsive to the information in and/or determined from the output signals satisfying one or more individual criteria in a criteria set associated with the specific vehicle event. A vehicle event recorded by the vehicle event recorder may include audio information, video information, information from the ECU, information from the active safety system, and/or other information.

By way of a non-limiting example, the system may detect that a driver has exited his lane 3 times in a 90 second period, where the criteria for triggering the event included activation of a lane departure warning system (e.g., information may be communicated across the ECU to the present system) and time elapsed. As another example, an event may be triggered to be stored based on criteria that include following distance as measured by an active safety system and time (e.g., following distance of less than 1.4 seconds for 10 or more seconds), where the distance is measured and based on a formula inclusive of time.

The vehicle event playback apparatus and/or the vehicle event recorder may include one or more processors. The processors may be configured to synchronize (e.g., systematically align) the information included in the output signals from the one or more sensors associated with the vehicle (e.g., the active safety system sensors, the vehicle system sensors associated with the ECU system of the vehicle, the non-standard aftermarket sensors installed in the vehicle as part of the vehicle event recorder). The processors may synchronize the information even though the information from the individual sensors may not be generated and/or received by the vehicle event playback apparatus at the same time. Synchronization may include associating data from two or more individual output signals with a single event timeline for a given event. An event timeline may have a start-time, an end-time, and/or a continuous period of time therebetween, for example.

In some implementations, the output signals from the one or more sensors may include time information indicating a time the information was generated, the order in which the information was generated, a timing of the generated information (e.g., periodic and/or continuous), and/or other time information. In some implementations, the processors may associate information in the individual output signals with a corresponding time location in the event timeline based on the time information included in the output signals.

In some implementations, associating information in the individual output signals to a corresponding time location in the event timeline based on the time information included in the output signals may not produce a synchronized event timeline. For example, the timing information in a first output signal (e.g., information indicating the start of an event at 2:40:48 PM) may not coincide with the timing information in a second output signal (e.g., information indicating the start of the same event may be received at 2:41:02 PM) even though both output signals include information related to the same event. In such implementations, the one or more processors may analyze information in the individual output signals and associate corresponding information in the individual output signals with the same time location in the event timeline, regardless of any time information in the output signals.

Analyzing the information in the individual output signals may include searching for expected information in individual output signals and associating the expected information with one or more appropriate time locations in the event timeline. Information conveyed by a first output signal may cause the processors to expect information in one or more other output signals. Continuing with the example above, one or more processors may determine that the information in the first output signal indicates the start of an event and may associate the information with the start of an event timeline (e.g., at 2:40 PM). After determining that the information in the first output signal indicates the start of the event, the one or more processors may search the information conveyed by the second output signal for information that also indicates the start of the event, regardless of any time information included in the output signal. After finding information in the second output signal that also indicates the start of the event, the processors may associate the found information with start of the event in the event timeline.

In some implementations, associating information in the individual output signals to a corresponding time location in the event timeline may be performed by the vehicle event playback apparatus. In some implementations, associating information in the individual output signals to a corresponding time location in the event timeline may be performed by the vehicle event recorder. The various data streams recorded within an event may involve some delays in the data collection process. These delays may vary by the signal (e.g., acceleration data may be received "faster" than the OBD vehicle speed data and even "faster" than the GPS data). These delays may be related to how the underlying sensors collect data. For example, accelerometers may be MEMS sensors that provide sub-millisecond readings. OBD vehicle speed measurement may be derived from an optical wheel speed sensor that generates pulses where the pulse periods are proportional to vehicle speed. This means that the slower the vehicle, the larger the delay in speed measurement because two consecutive pulses are necessary to estimate the vehicle speed. These delays may be measured in tens of milliseconds, but nonetheless represent delays that may result in misalignment of data when compared to accelerometer signals, for example. GPS relies of triangulation of satellite signals to determine the vehicle location. Many GPS systems determine the vehicle location once every second. Two consecutive vehicle locations measurements are necessary to derive the speed (e.g., distance between the points divided by the time interval between the measurements). Therefore, speed measurements from GPS systems are typically delayed by one second. Another reason for the delays in input signals may be related to the various buffers employed by electronic devices as they transmit information. Many communication devices send data in packets, which involved waiting for enough data to become available before sending the packet of information. These wait times further contribute to the input signal delays.

In some implementations, by being aware of these fixed time delays, the system may be constructed to purposefully delay individual signals except for the most delayed signal such that the individual signals become aligned with respect to time (e.g., synchronized) with the most delayed signal. After synchronizing the signals, the vehicle event recorder may store the aligned signals in volatile memory and/or other electronic storage.

Responsive to triggering of a vehicle event, the event data may be saved from a volatile memory to a non-volatile memory. The vehicle event recorder may compensate for the known delay in individual signals such that the saved event may be properly centered around the trigger point. For example, the largest signal delay may be 1.75 seconds. In this example, the individual signals (other than the one with the largest delay) may be purposefully delayed by additional delays (1.75 seconds minus the delay for the particular signal), such that aligned data is written to volatile memory with a 1.75 second delay. At the time that a vehicle event is detected (e.g., at the time a detection trigger signal is received), the vehicle event recorder may record a 30 second event with 15 seconds before the detection and 15 seconds after the detection. Upon receiving the trigger signal, the vehicle event recorder may immediately select the last 16.75 seconds (15 plus 1.75) of event data to be written from volatile to non-volatile memory, and then save the remaining 13.25 seconds of data (15 minus 1.75).

An indication that the vehicle event was detected (e.g., a trigger signal) may also be delayed. Triggers such as external voltage signals, where the trigger is generated on the rising edge, may not involve delays. However, more complex triggers may rely on delayed signals and a triggering algorithm itself may introduce additional delays. For example, a simple accelerometer triggering algorithm that involves measuring braking force may be configured to trigger once deceleration of 0.5 g is maintained over 1.0 seconds. This means that the triggering signal may be generated once the 1.0 seconds elapses with deceleration exceeding 0.5 g. However, the trigger point would ideally be identified in the middle of this interval, or at 0.5 elapsed seconds after the deceleration first exceeds 0.5 g. Therefore, the triggering signal from this triggering algorithm may be considered to be delayed by 0.5 seconds. A vehicle event recorder may compensate for triggering delays when saving event data from the volatile memory to the non-volatile memory. In the above example where all aligned signals written to volatile memory are delayed by 1.75 seconds, upon receiving a trigger signal that is known to be delayed by 0.5 seconds, the vehicle event recorder may compensate for this additional delay by immediately selecting the last 16.25 seconds (15 plus 1.75 minus 0.5) of event data to written from volatile to non-volatile memory, then proceeding to save the remaining 13.75 seconds of data (15 minus 1.75 plus 0.5).

By way of another non-limiting example, the one or more sensors may include an accelerometer (e.g., associated with the vehicle event recorder), a camera (e.g., associated with the vehicle event recorder), a sensor associated with the vehicle ECU, and/or other sensors. The accelerometer may generate output signals indicating that the vehicle has started breaking. The accelerometer information (e.g., the braking start time) may agree with video images that show the vehicle beginning to slow down. Information from the vehicle ECU may not indicate that the vehicle is breaking until a short time later, when the vehicle ECU information is received by the one or more processors of the vehicle event data playback apparatus. In this example, the one or more processors of the vehicle event data playback apparatus may synchronize the information from the accelerometer, the camera, and the vehicle ECU system so the information may be presented to the user in a synchronized manner. The user may better understand the event because of the synchronized information. The user may better understand the cause of the event, the outcome of the event, road and/or other environmental conditions during the event, and/or other information related to the event by viewing the synchronized information.

As shown in FIG. 1A, view 3 includes a first (e.g., forward looking) video playback view 4, a second (e.g., vehicle interior driver video) playback view 5, an event timeline 7, a graphical representation 9 of information related to the operation and/or the context of the vehicle, one or more visual representations 11 of information related to the operation and/or the context of the vehicle, visual representations 13 of vehicle ECU information, a notation field 15, and/or other information. In some implementations, view 3 (as shown in FIGS. 1B-1G) may not include all of the components of view 3 shown in FIG. 1A. The number of video playback views shown in the figures is not intended to be limiting. The number of video playback views does not necessarily correspond to a number of cameras included in the system. For example, even though in some of the figures only two video playback views are shown, there may be 1, 2, 3, 4, 5, or more cameras included in the system. The two views may playback information from any two of the cameras, and/or other components of the system.

Figure 1E:
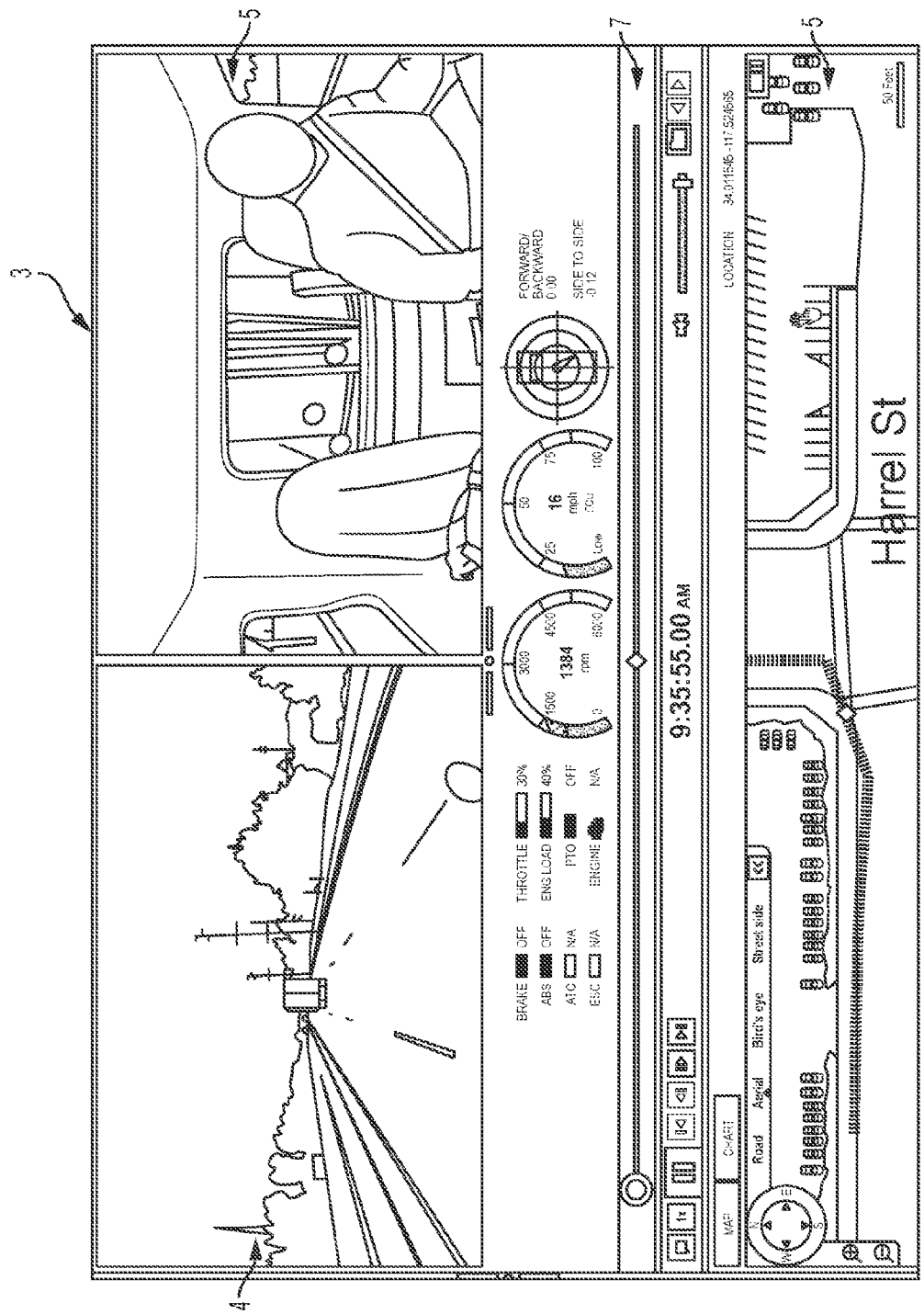
Figure 1F:
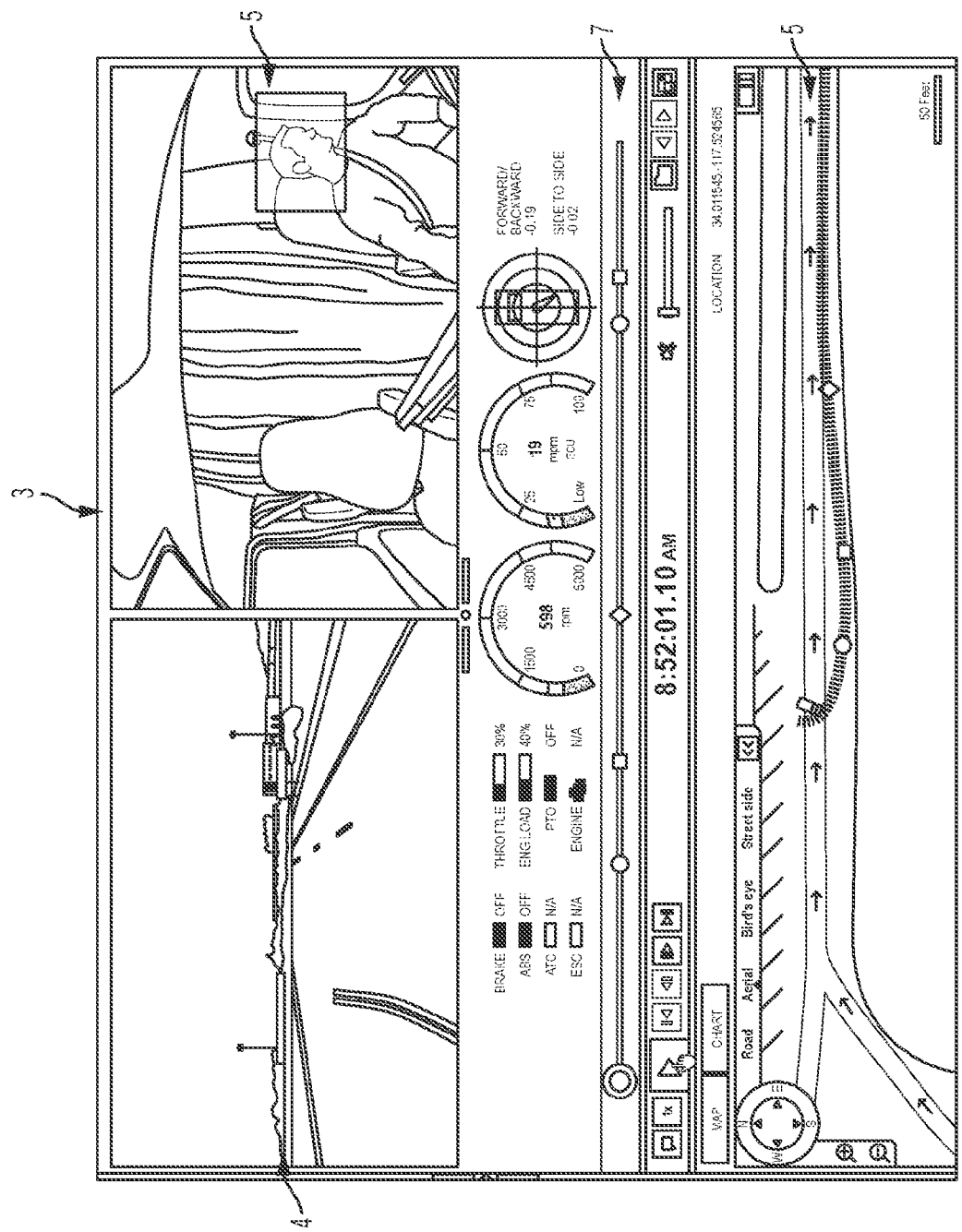
Figure 1G:
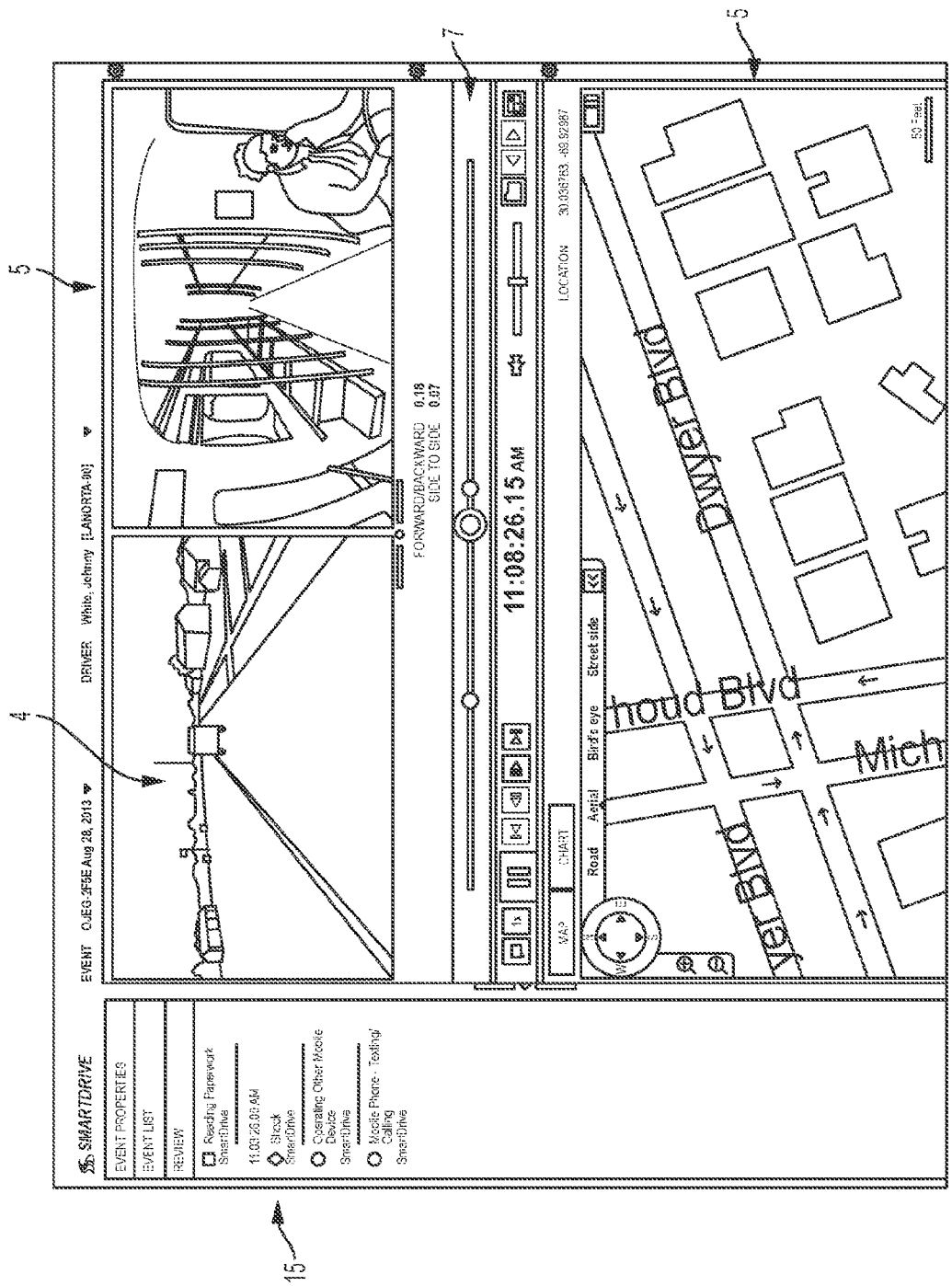

In some implementations, view 3 may include additional components now shown in FIG. 1A (e.g., an additional playback view 5 as shown in FIGS. 1E, 1F, and 1G). In some implementations, the components may be presented with a different visual format. In some implementations, view 3 includes one or more active safety system fields 19 (shown in FIGS. 1B, 1C, 1D, and FIG. 2). The one or more active safety system fields may present information related to detections and/or alerts by the active safety system. In some implementations, the active safety system fields may present a textual, numeric, graphical, and/or other representative indication of what the active safety system communicates to the driver of the vehicle. For example, the active safety system may alert a driver via a red/yellow/green color coded display that is part of the active safety system. The red/yellow/green color coded display may be reproduced in the one or more active safety system fields 19 of the graphical user interface of the vehicle event data playback apparatus. In some implementations, the active safety system fields in view 3 may reproduce the active safety system detections and/or alerts presented to the driver in real time and/or at another time.

The additional components of view 3 are described in more detail below. The information presented by the one or more active safety system fields and/or the other components of view 3 of the graphical user interface may be synchronized by the vehicle event recorder and/or the vehicle event data playback apparatus and displayed to the user at the same time. The synchronized display may be in real time (e.g., a remote user may view the synchronized information while the driver is operating the vehicle) and/or at a later time.

The graphical user interface may be specifically designed to function and/or cooperate with the vehicle event recorder, the active safety system, and/or the event dataset/alert information they produce. Such a graphical user interface may be interactive and/or responsive to user/operator inputs affected by a computer and/or other peripheral devices. For example, a 'point-and-click' action of a computer mouse, entering and/or selecting information via a touch screen, and/or other user/operator inputs. In some implementations the graphical user interface may be presented to a driver of the vehicle and/or other users (e.g. located at the vehicle and/or located remotely) via a user interface associated with the active safety system. In some implementations, the graphical user interface may be presented to a driver of the vehicle and/or other users via a user interface separate from the active safety system. In some implementations, the alerts and/or other information generated by the active safety system may be presented to a driver of the vehicle and/or other users via the graphical user interface of the vehicle event record playback system.

This system may include couplings to a vehicle event recorder and/or data captured via the vehicle event recorder, couplings to the active safety system and/or data captured via the active safety system, and/or other systems. This system may include one or more processors, one or more display devices, one or more graphical user interfaces, and/or other components. This system may receive as input vehicle event recorder datasets, information generated by the active safety system, and/or other information. Prescribed program code may be executed by the one or more processors to operate on datasets received from the vehicle event recorder, the active safety system, and/or other sources. Data from these datasets may be passed into control objects as parametric input to drive the various visual states of the control objects.

The graphical user interface of the vehicle event recorder dataset playback system presented herein may be comprised of a plurality of control objects. These control objects may include visual depictions of information which may change in response to user interaction and/or specific data values of a dataset under review. Some of these control objects may be interactive and adjusted responsive to 'point-and-click', 'click and drag', touch screen touches, and/or other user interactions. Control objects of these systems may be coupled to, and/or designed to cooperate with, data types and/or data objects unique to vehicle event recorder event record datasets, information from the active safety system, and/or information from other sources.

The control objects may have an appearance and/or data ranges that are correlated with information generated by vehicle event recorders during operation of vehicles. The control objects of these graphical user interfaces may have be configured to visually express data and/or information which is contained in a vehicle event record event dataset, information generated by the active safety system, and/or other information. Illustrative examples are included herefollowing.

Control objects may include and/or display information based on logic code. Logic code (not visible to a user) may facilitate receipt of input data, parsing that data, processing the data in accordance with prescribed algorithms (e.g., which are part of the logic code), providing outputs which may include adjustments to the visual states of the control objects, and/or other actions.

It should be noted that the series of control objects described below and shown in FIG. 1-FIG. 11 are not intended to be limiting. The system described herein may be configured to generate control objects related to any vehicle operation information that would be helpful for a user reviewing event data recorded before, during, and/or after a vehicle event.

A vehicle event recorder may be configured to capture compound datasets relating to vehicle operation and/or events during a finite period. Accordingly, one or more aspects of this vehicle event playback system may relate to a timeline control object and/or its relationship with the event dataset, and/or other controls of the graphical user interface. Timeline control objects may include an associated time range equivalent to the time range of the event period. The time range associated with a given event may vary in length from a fraction of a second to several tens of minutes or even hours. However, many events recorded by vehicle event recorders may be a few seconds or a few tens of seconds. Timeline control objects in accordance with these teachings may have one or more of a 'start time', an 'end time', a continuous time period therebetween, and/or other features. The 'continuous' time period between the start time and the end time may include a finite number of frame instants and/or frame stops, for example. These may be discrete moments in the event period for which an image may be captured. A timeline control object of these graphical user interfaces may be synchronized with the time span of events recorded by a vehicle event recorder when its start time and end time are set in accordance with specific related values in an event record dataset. In the example illustrated as FIG. 1, an event record includes a start time of 4:19:35 and an end time of 4:20:02 for a total event period of 27 seconds.

In some implementations, via the graphical user interface, a user may control the length of the event period, select (e.g., by clicking and/or touching a location) an individual time within the event period, continuously play the frame instants, rewind and/or fast forward the frame instants, and/or control the length of the even period in other ways.

For improved ease of operation of these timeline controls, when playing back vehicle event record data, it may be useful for a user to arrange the control to extend an appreciable length of interface regardless of the event period extent. That is, a timeline control which supports a twenty-seven second event may be the same size as a timeline control which supports a 10 minute event. Thus a timeline control may be 'normalized' to the event period without change of its physical size. In view of the data contained in an event record dataset, the start time and/or the end time may be associated with the timeline control extremities, and/or 100% of the timeline control length may be divided evenly and/or occupied by the entire event without dependence upon the actual extent of the event period. Accordingly, the timeline control object may cooperate with playback of the vehicle event recorder output in that the timeline may auto-adjust to normalize for events of any period length.

Figure 2:
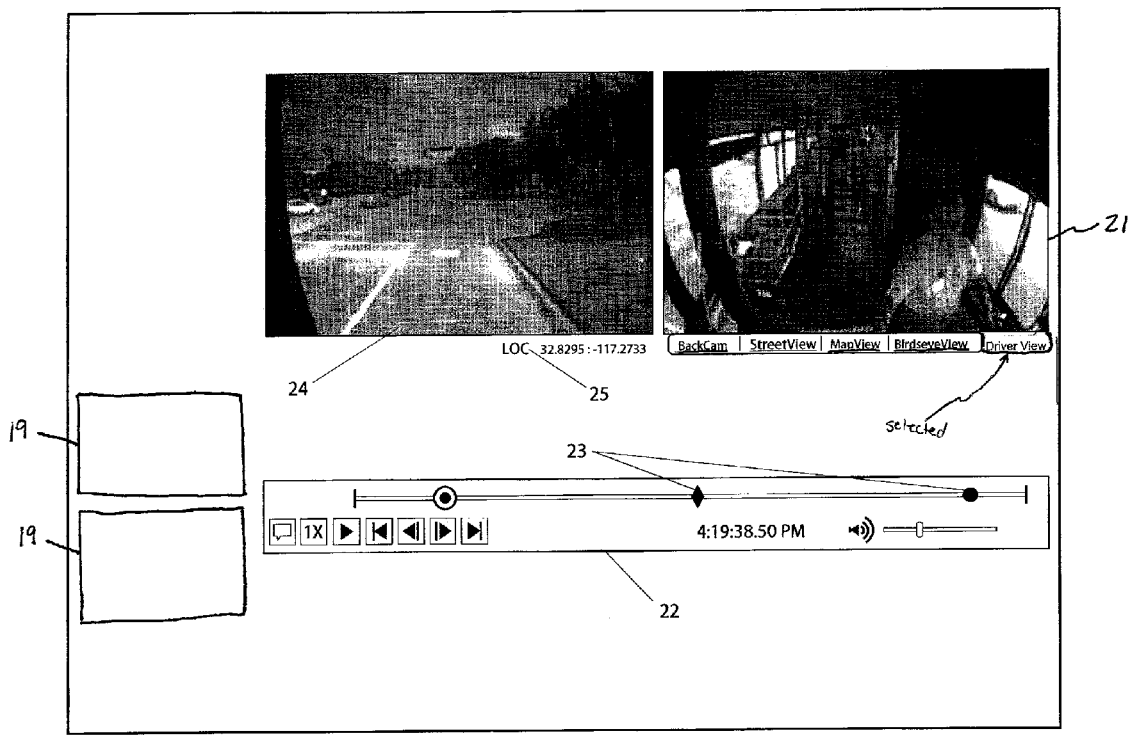
FIG. 2 presents a timeline control time synchronized with images presented in related image control objects.

A timeline control object may be adapted to match the extent of a time period of a specific event under replay and/or thereafter may be set to agree with a specific event record. For example, as shown in FIG. 2, timeline pip markers 23, which may indicate noteworthy features of the event record, may be distributed about the timeline to provide access to information relating to those features. Timeline pip markers 23 may be pre-encoded elements made responsive to mouse clicks, touch screen touches, and/or other control indications entered and/or selected by a user via the graphical user interface and/or one or more peripheral devices. These pip markers may be associated with an instant in time and/or a time period which is a subset of the entire event period. Other control objects of the graphical user interface may be coupled to these pip marker objects and/or may be responsive thereto. They may be responsive to mouse clicks, touch-screen touches, and/or other control gestures associated with the pip markers. FIG. 2 also illustrates event timeline 22, image series players 21, 24, and a vehicle location 25.

The timeline object may include a timeline replay instant indicator control object. The instantaneous state of a timeline replay instant indicator may specify a replay instant in time, the replay instant to which other controls may be bound and responsive. A timeline replay instant indicator may mark the present instant of the playback system at a given time. The present instant may represent a moment in the event period between the event start time and the event end time. For controls bound to the timeline control object, the present instant time may be used to set the visual state of the control (individually, or as a coordinated group). The visual state of a control object may be different for the individual instants of the event period. When the timeline replay instant indicator is associated with another time instant of the event period, either manually or during a pre-play execution, individual ones of the controls bound to the timeline control may automatically update their visual state to represent data captured at that moment of the event period. Timeline replay instant indicators may be responsive to click-and-drag, touch, and/or other actions, and/or may be responsive to automated replay controls such as 'play' control, 'fast forward' control, 'rewind' control, etc.

Replay controls of these systems may include, for example, a 'play' control button, 'fast forward', rewind, 'loop', and/or other controls. Timeline control objects of these vehicle event playback systems may also include such controls.

Timeline control may be sensitive to keyboard input. For example, left and right arrow keys may be used to advance the timeline backward or forward, respectively, by one video frame (e.g. 0.25 seconds for 4 frames per second video) at a time. The space key may be used to start and/or pause the event data playback. Page Up and Page Down keys may be used to advance the timeline in larger fixed time intervals, such as 5.0 seconds forward or backward, respectively.

Modes of vehicle event playback systems presented here may include side-by-side playback of a plurality of videos (time series presentation of images). In two separate video control objects, a prescribed video may be played back synchronously. For example, a view from the front of a vehicle and a view from the back of the vehicle may be synchronized to represent separate images taken at the same point in time and played side by side. In some implementations, the synchronized video may be synchronized with vehicle ECU data, for example. This may be useful in gaining an understanding of a complex scene which may have more than one point of view, such as a driving incident. For example, in a driving incident it may be important to consider the precise timing of event in the view of the driver and/or in view of traffic ahead. When these two views are considered together, an expert reviewer may draw more precise conclusions with regard to the event details. Accordingly, the event playback systems may include side-by-side video playback controls for playing back videos of two or more unique viewpoints.

Vehicle event recorder systems may include a plurality of video cameras positioned at a plurality of video capture stations (locations). An individual video capture station may have a unique viewpoint relative to other video capture stations. In some vehicle event recorders, a 'forward-looking' camera may be arranged to capture a traffic view ahead of the vehicle and a second reward looking camera may be arranged to capture a view of a passenger/driver space.

There may be a time relationship between these two video views because actions taken by a vehicle operator may relate to the traffic and conditions ahead. One may understand a driver's response to things which may be discovered observable in the forward view. The vehicle event data playback systems may include a plurality of video players where individual views of the video players may be synchronized in time to the others and/or timeline control objects, and/or with respect to the timeline replay instant indicator. Where vehicle event recorders support more than two video cameras, a single timeline control may be used to synchronize those in a similar manner.

An operator/reviewer of these vehicle event data playback systems may 'scroll' through discrete video frames of the event timeline by adjusting the playback instant indicator, for example via 'click-and-drag', touch, keyboard key strokes, and/or other types of actions. Accordingly, the graphical user interface of this invention may include video playback controls coupled to the playback instant element of a timeline control object. In this way, two separate views about the vehicle environment may be considered simultaneously in a side-by-side arrangement where both views represent substantially the same instant in time as synchronized by the timeline control.

While some versions of these systems include side-by-side playback of forward facing and rear facing (for example) views taken from video cameras in a vehicle event recorder, (e.g., 'real' video), alternative versions may include at least one video playback display in which a 'virtual video' is presented. A virtual video may include a time series of images whereby the images are captured in a system which is not a vehicle event recorder. However, these virtual videos may relate directly to the events captured. For example, one type of virtual video in accordance with this teaching may present images having dependence upon the event timeline. Another example may have dependence upon the vehicle position as a function of time. Still another may have a position dependence with prescribed offset. Other examples are contemplated. More details of these types of virtual videos follow.

Figure 3:
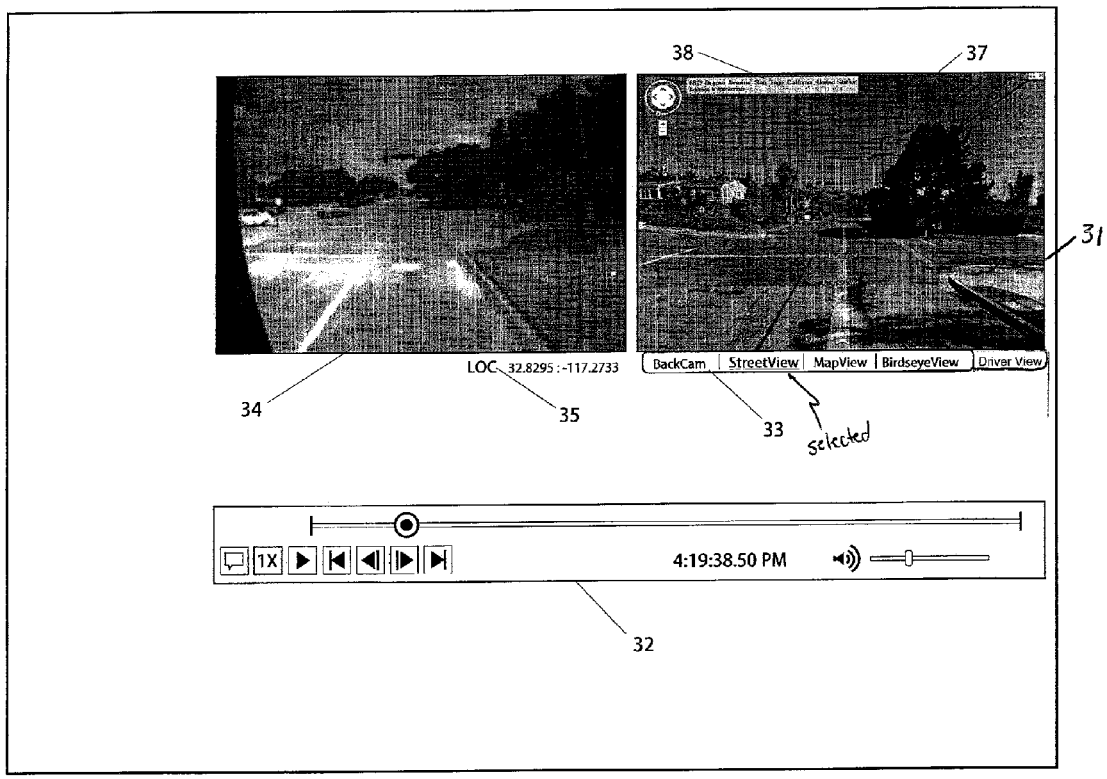
FIG. 3 illustrates side-by-side, time synchronized video players coupled to two video data sources related via a vehicle event record dataset.

In some implementations, as shown in FIG. 3, an image series player 31 (video player) may be arranged to play an image series which was not recorded by the vehicle event recorder. Rather, a plurality of still images is recalled from a prepared database to form an image set which may be played in series. Those images when played together as a 'video' in the video player may constitute a 'virtual video' for purposes of this teaching. However, this replay may be well coordinated and having direct dependence with respect to the event record. For example, this virtual video timeline may be synchronized with the event timeline 32. The actual location of a vehicle as recorded by the vehicle event recorder may be coupled to the viewpoint from which the recalled images are made.

When the timeline control is set into a 'play' mode, the video of actual captured images may appear in a video player control adjacent to a second player which plays the virtual streetview video. This virtual video may include images from the same locations and/or viewpoints with respect to the event period, but these images may include enhancements and augmentations to bring a more complete understanding of the actual event. In one example, streetview images provided by a service like Google's StreetView system may be recalled in view of a plurality of position measurements taken by the vehicle event recorder. For this plurality of locations (vehicle's location as measured by a GPS for example) captured over the period of a given event, a streetview image from a corresponding location may be recalled from the image database. Individual recalled images may then be assigned a time instant corresponding to those times from which the playback timeline is comprised to assemble a virtual video of streetview images which directly corresponds to the video actually captured at the vehicle event recorder cameras. One advantage may lie at least partly in the clarity of the recalled images which may have been provided on a nice sunny day in comparison to images captured by the vehicle event recorder which may be of inferior clarity due, for example, to inclement weather including fog or sun glare, nighttime darkness, a large vehicle that obstructs the view of the event recorder, and/or other factors. Further advantages may be realized in view of the labels which may be may be incorporated with the prepared streetview images. For example, address label 28 may indicate a street address most closely associated with the image viewpoint. FIG. 3 also illustrates event timeline 32, image series player 34, vehicle location 35, a street address 38 corresponding to the vehicle location, a street view image 37 corresponding to the vehicle location, and/or other information.

Another benefit of this approach is that streetview may be further manipulated by the user to gain a better understanding of the environment in which the event was captured. For example, the user may pause the event playback, then rotate the streetview to show the image to the left, right or behind the vehicle. The system may be configured such that this user action would temporarily decouple the streetview from the event playback. Upon restarting the playback of the paused event playback, the system may be configured such that streetview would then realign and show the view in front of the vehicle again.

It may be inconvenient to view many videos simultaneously. To address this, these players may have two players side-by-side with the video type selectable in the interface by way of a tab strip control 33, which as shown in FIG. 3 for example, may include five tab selections (e.g., "Back-Cam", "StreetView", "MapView", "BirdseyeView", "Driver View", and/or other tab selections). In agreement with which tab is selected and triggered, the video playback may be switched between the possible video presentation types. The player may present a synchronized playback of both real and virtual videos in agreement with the event period and/or the timeline control. The example of two side by side players is not intended to be limiting. The system described herein may have any number of players in the graphical user interface. The multiple players need not be side by side. They may be positioned anywhere in the graphical user interface that is helpful to the user. Additional views that correspond to additional cameras may be provided, for example. In some implementations, the cameras may include a forward road camera, an interior cab camera, a left side backward facing camera, a rear of the vehicle backward facing camera, and/or other cameras. The additional views/cameras may give greater perspective for a review analyst and/or a coach reviewing the information.

Figure 4:
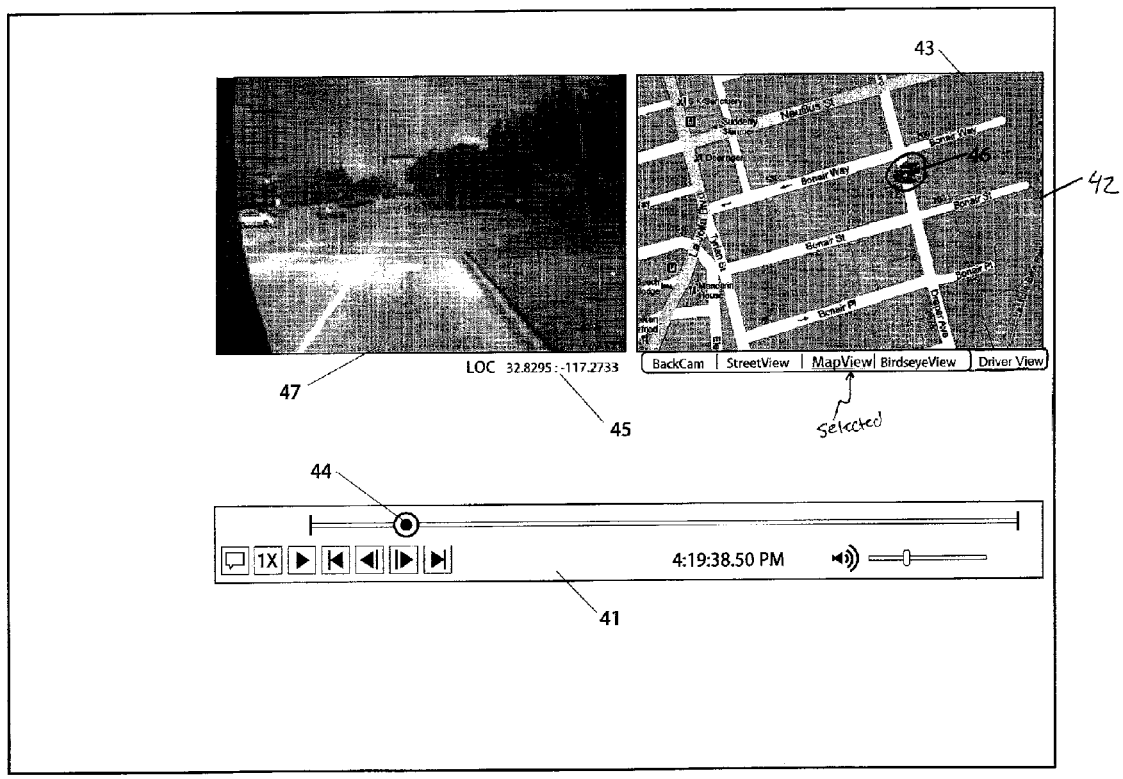
FIGS. 4-6 show additional versions of side-by-side time synchronized video players similarly coupled to related video from sources other than vehicle event recorders.

There may be another type of virtual video which may be supported by these playback systems which relates to moving maps. A map view virtual video is depicted in FIG. 4. In a fashion similar to that described in the streetview embodiment, a plurality of map images may be prepared and saved to form an image series consistent with an event record dataset. The vehicle location and/or the event timeline 41 may be considered in forming a series of map images suitable for playback in a mapview video player 42.

A separate map image 43 with appropriate scale, size and orientation may be presented in the viewer for every discrete instant of the event period as represented in the event timeline. When playback instant control 44 is moved to another time (constant) of the event timeline, the vehicle also moves (in most events). The new vehicle location 45 may cause a new map and/or a separate map image to be allocated and displayed for that time instant. The image in image series player 47 may correspond to vehicle location 45. The vehicle's position within the map may be indicated by an icon marker 46 to reflect the position of the vehicle as measured by the vehicle event recorder. In a an event replay, the series of map images may be played back synchronously alongside the actual forward view images (for example) captured at the vehicle event recorder camera.

A mapview player in accordance with this teaching may be useful when it is arranged to present maps with enhancements and/or markings which may be derived from information in the event record dataset. For example, when actual vehicle speeds are compared to local speed limits, a determination may be possible with regard to regions in which a speed infraction occurs. A graphical representation of the same may be included superimposed with the maps presented.

Figure 5:
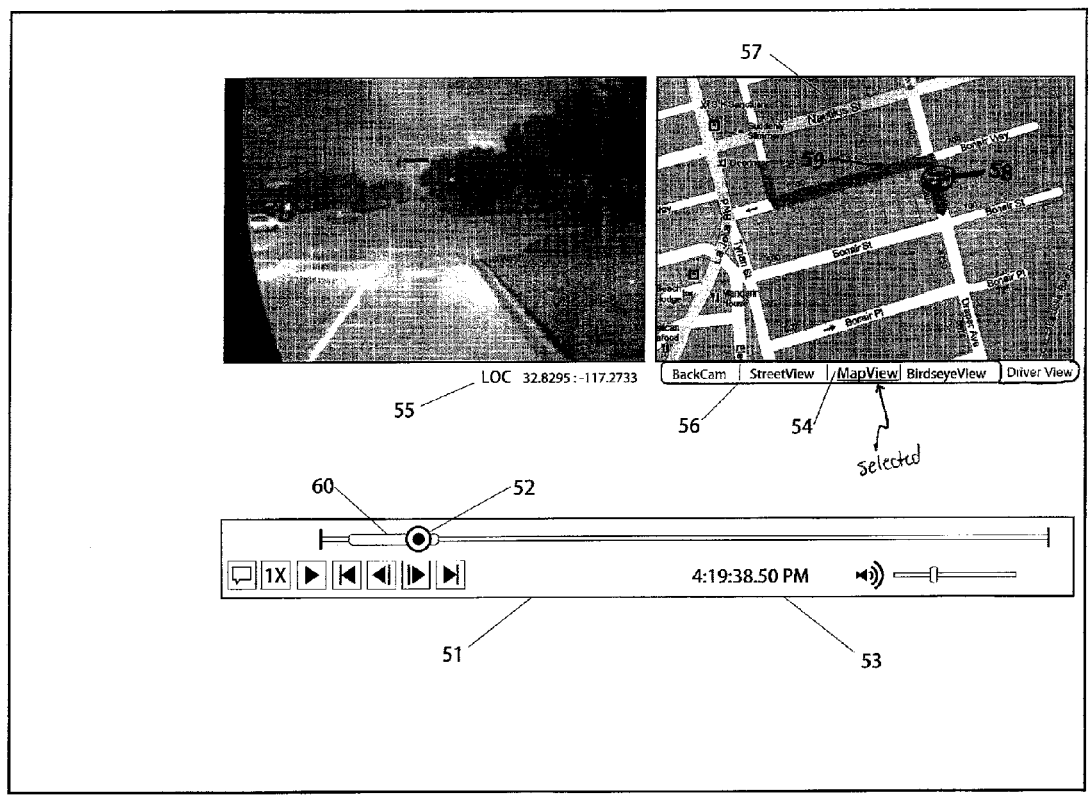
Figure 6:
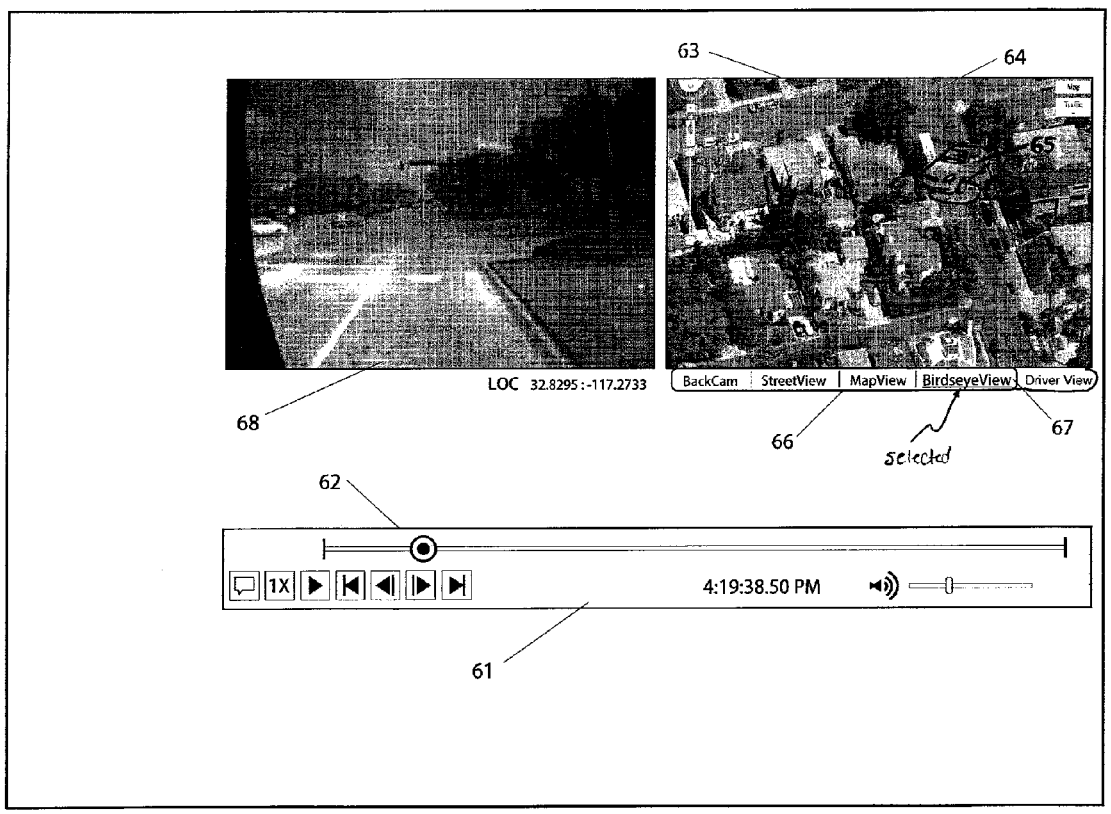

With reference to FIG. 5, timeline control object 51 agrees with the event record dataset from a vehicle event recorder. A playback instant control 52 marks an instantaneous moment of the event period. At the moment 4:19:38.50 p.m. indicated in a numeric label control 53, the vehicle GPS system determined the vehicle location at latitude 32.8295 and longitude −117.2733 as recorded by the vehicle event recorder's position determining system and position is reported numerically at position label control 55. In some implementations, the latitude and longitude information may be translated into a street address by the system and/or presented to the user in a field of the graphical user interface.

With the video player set into a map view mode 54 by a tab strip tool 56, a map image 57 suitable in scale and location may be presented that shows the vehicle's location at the corresponding instant in time. An icon image of a car 58 (for example) may mark the location in the map. In addition, a spatial highlight 59 for example (highlighting portions of Bonair and Draper streets in the image), may be superimposed on the map image to mark regions where speeding infractions have been identified.

Timeline marker 60 may designate a finite period of time within the event period when the speeding occurs. Thus, some timeline controls of these systems may include marker objects aligned and/or cooperative with elements appearing in virtual videos. This cooperation may be due to associations with time instants within the event period.

Both the streetview player and the mapview player may offer advantages in reaching a complete understanding of a scene. They may be augmented based on information collected by a vehicle event recorder.

Another virtual video player that may be included in these systems may be characterized as a bird's eye view virtual video player. Illustrated in FIG. 6, a bird's eye view video player of these systems may include images taken from an elevated viewpoint, for example images made from an airplane and/or satellite. In consideration of the vehicle's time-dependent position as measured and/or recorded by a vehicle event recorder, images may be selected from a prerecorded database of so described images, and/or obtained from other sources.

Timeline control 61 specifies an instant in time by a playback instant control 62. Video player display 63 may include an image 64 and a 'car' icon marker 65 to indicate the location of the vehicle at the capture time 4:19:38.50. When tab strip 66 is used to set the video player into a bird's eye view mode 67, an image series of perspective images made from altitude may be played back in time with respect to the event timeline. As the event player executes playback of event data, images displayed by image series player 68, bird's eye images 64, marker icon 65, and/or other components of the system, may be updated for instants of the timeline to reflect appropriate views of the event scene.

Because the image viewpoint may be selectable, it may be possible to specify that the viewpoint be constant at a virtual location, for example 100 meters behind the car and/or 50 meters above the car, and the view direction may point in the direction of travel with respect to the vehicle. In this way, the bird's eye view playback virtual video may be envisioned as if a helicopter video camera followed the car throughout the event to make the video images. A reviewer may gain a clearer understanding of the event environment as presented in a synchronized manner alongside with other event record information.

Accordingly, these vehicle event data playback systems may include one or more of a real view video player, a virtual video player, and/or other video players which may be arranged to interact with event data recorded in vehicle event recorders. Individual ones of these specialized video players may provide a time synchronized image series in conjunction with a visual presentation of other related event record data.

While the preceding description sets forth several video playback control objects, the following description is directed to other aspects of these vehicle event playback systems which may not be based upon data from image systems. Rather, the graphical user interface may control objects presented herefollowing to express non-image data from a plurality of sources. In some implementations, these sources may include onboard data systems. In some implementations, information sources may include those which are external with respect to a vehicle and/or its vehicle event recorders.

Control objects of graphical user interfaces of these playback systems bound to vehicle onboard systems may have two primary but non-limiting types including: 1) control objects bound to data from sensors deployed as part of a vehicle event recorder apparatus, for example a vehicle event recorder may include accelerometers which measure G-force levels in two orthogonal spatial dimensions while a vehicle is being used; and 2) a control object bound to vehicle subsystems characterized as those installed by a vehicle manufacturer. Other types are contemplated. Data provided by way of a vehicle's ECU systems may be received, managed, parsed, and/or time-stamped at a vehicle event recorder which forms a dataset to which control objects of the graphical user interfaces may be bound. In some implementations, control objects of graphical user interfaces of these playback systems bound to vehicle onboard systems may include a third type. The third type of control object may be associated with the data generated by analysis modules of the vehicle even recorder, such as a wasted fuel estimate, triggers for dangerous driving maneuvers, calculated fuel consumption from mass air flow sensors, and/or other data generated by analysis module of the vehicle event recorder.

Some control objects of these systems may be bound to data sources not part of a vehicle event recorder system and/or external with regard to vehicle subsystems. These control objects may be nevertheless implicitly strongly coupled to event record datasets which are subject to playback in these devices and methods. In one illustrative example, a notation system which associates an expert reviewer's comments and notes with portions of an event record in a note field or notation control object may be coupled to receive data therefrom. Details of these types follow.

In one version, a control object and/or plurality of control objects may be coupled to the timeline control and thus the event period to affect time synchronization between these. Acceleration control objects may be arranged to visually show acceleration data collected during an event captured with a vehicle event recorder. With respect to acceleration data collected in a vehicle event recorder, it may be useful to present this type of information in two fashions. First, it may be useful to present instantaneous acceleration data associated with an instant of time during the event period. In a second fashion, acceleration data collected over the entire event period (or finite subset thereof) may be displayed in a graph of two axes. Force data may be presented in a form where the abscissa of which may be time, and the ordinate force.

Figure 7:
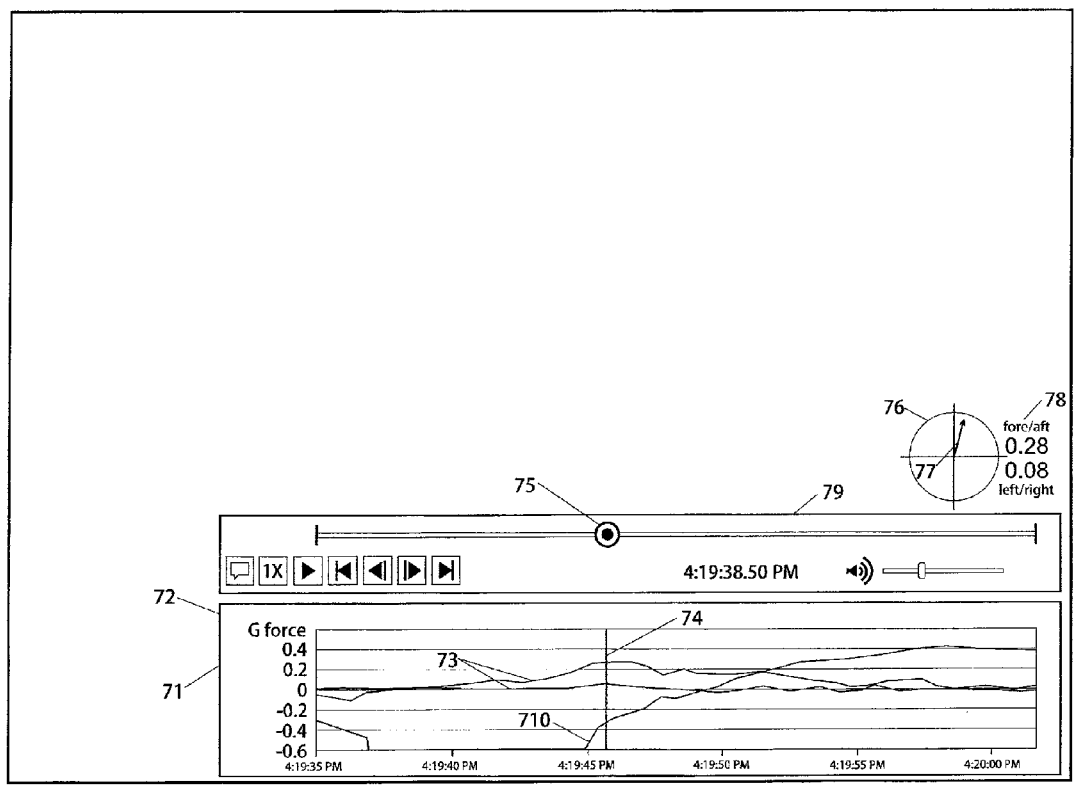
FIG. 7 illustrates coupled control objects designed to express data both graphically and alphanumerically, wherein the control objects may be coupled to, and/or responsive to a vehicle event timeline.

For example, in FIG. 7, a view 72 of a first acceleration control object includes a line graph 71 representation of acceleration data into orthogonal directions. 'G-force' or acceleration is plotted versus time to form line representations 73 of acceleration data. A playback instant indicator 74 is synchronized with the playback instant indicator 75 of the timeline control object both spatially and with respect to displayed data.

Another related acceleration control object 76 which expresses acceleration data in an alternative visual form is additionally illustrated. This 2-D expression of instantaneous force includes a pointer 77 which gives a visual representation of force in both forward/aft and left/right directions 78 (also synchronized with playback instant indicators 74 and 75). The acceleration control objects may be bound to information in the event record dataset whereby synchronization is realized with respect to the timeline control and other control objects similarly bound including the video display control objects. Accordingly, control objects may be arranged to present instantaneous data as well as plots of data over time. In both cases, these controls may be bound and/or responsive to the playback timeline 79.

Vehicle event recorder systems may produce information-rich event record datasets. Event record datasets of vehicle event recorders may include data captured at vehicle subsystems, for example, by way of the onboard diagnostics and/or ECU systems. In vehicle event recorder systems so equipped, data captured at various vehicle subsystems may be time-stamped in a scheme coordinated with the event period and/or with video frame capture rates. Where such data is time-stamped, it may enhance synchronous replay via these vehicle event data playback systems.

Accordingly, these vehicle event data playback systems may be suited for playback of vehicle event records having been formed with time-stamped data from factory installed vehicle subsystems. Some vehicle event recorder systems may be arranged to capture engine speed data and/or to associate a time instant with speed data measurements. Engine speed in 'revolutions per minute' or RPM, may be read from an ECU via a coupling to which a vehicle event recorder may be connected. In some alternative versions, engine speed measurements may be made via 'aftermarket' installed sensors and/or vehicle subsystem detector which may obviate need to directly couple with the ECU. In either case, when event record datasets which are compatible with these playback systems are prepared and recorded, individual engine speed measurements may be associated with an instant in time and/or "time-stamped". In systems common in the art where engine speed is recorded, engine speed is generally recorded without regard for simultaneous and/or synchronized playback. In those systems, engine speed data may not be provided with an association with time. Because it is a goal of these playback systems to playback data in a synchronized fashion, it may be necessary to time stamp data in this way. Where vehicle subsystems, for example an engine tachometer, do not provide measurement data at a rate equal or similar to video camera frame rates, data smoothing and or data averaging may be used to improve a dataset or portion thereof to make it better cooperate with the objectives of these playback systems, which may include a discrete number of time instances on an event timeline. Common vehicle tachometers may not face this restriction and may be otherwise free to take measurements at a convenient rate including those rates having unequal periods between data measurements. To facilitate time synchronization in these playback systems, the moment any measurement is made may be accounted for.

Many modern vehicle manufacturers may include advanced electronic systems with many of the vehicle's subsystems. For example, a mechanical accelerator pedal often includes a transducer from which pedal position may be readily measured. However, electronic data which may exist within a vehicle's proprietary electronic control schemes may not always readily available for third-party use. In some implementations, vehicle event recorders may be unable to record information relating to vehicle performance parameters such as the odometer on light duty vehicles, the fuel flow meter on light duty vehicles, and/or other parameters. This is not intended to be limiting. The system described herein should be understood to utilize any information made available by the vehicle's subsystems. If unavailable types of information are eventually made available by the vehicle manufactures, it should be considered within the scope of this disclosure to include a control object associated with the newly available information.

In implementations where a vehicle event recorder may be successfully coupled to vehicle electronic subsystems to receive the difficult to obtain and/or newly released data, the vehicle event recorder may be adapted to pass the data and/or manage a timestamp scheme in conjunction with the vehicle event recorder. For example, if a vehicle event recorder operates with a video frame rate of 30 frames per second, but the factory installed odometer and/or fuel flow data only update three times per second, a data recording scheme may be set to rectify timing issues between these independent data sources so that an event dataset may accurately reflect an 'instantaneous' time value for the data elements.

Figure 8:
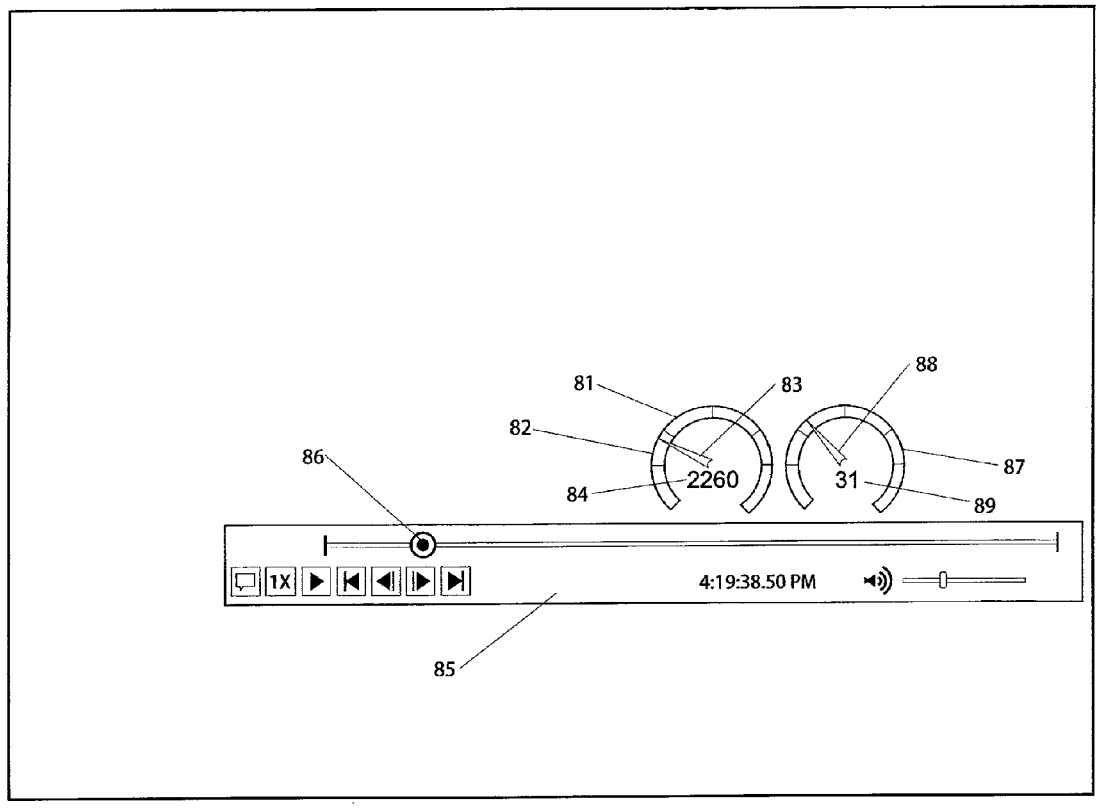
FIG. 8 includes illustrations of a version of vehicle speed and engine speed control objects synchronized and commonly coupled to a timeline control.

Vehicle event recorder systems which record time-stamped engine speed data are not known in the art. As such, synchronized playback of same has been impossible. As shown in FIG. 8, in systems disclosed herein, engine speed information may be expressed graphically in a visual presentation, in an alphanumeric expression, and/or in other forms as at least part of an engine speed control object 81. An engine speed control object of this example may be comprised of graphical portions and/or alphanumeric portions. An analog arc 82 may provide a range continuum upon which instantaneous magnitude may be displayed by a pointer 83. A digital numeric readout 84 may allow an instantaneous report of engine speed for an instant of the event timeline 85. Playback instant indicator 86 may be moved (e.g. via mouse type computer pointing peripheral device) to any point along the timeline. The engine speed control object, which is bound to the timeline, may be updated to indicate the engine speed recorded at that particular time. In a similar control object, vehicle speed control object 87, pointer 88 may yield an instantaneous value of '31 mph' on an analog scale, while a digital numeric value 89 may also be provided at vehicle speed label.

Figure 9:
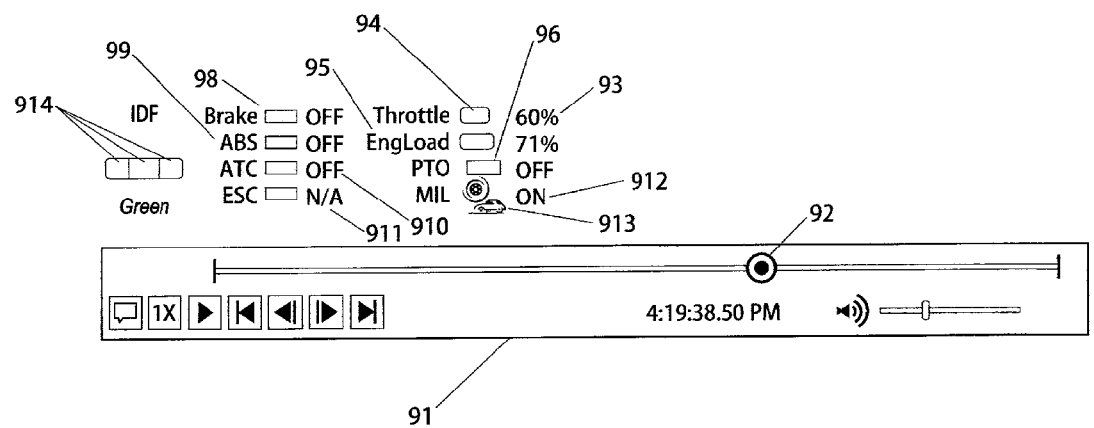
FIG. 9 is a drawing of a plurality of control objects which are bound to standard vehicle sensors via on-board diagnostics and/or engine control module systems of a subject vehicle.

Event records which may compatible with, and/or may be played by these vehicle event playback systems may include measurement data from the groups characterized as those including: throttle position data, engine load data, power takeoff system data, malfunction indicator light system data, brake system data, antilock brake system data, automatic traction control system data, electronic stability control system data, excess fuel consumption system data, and/or other data. FIG. 9 illustrates an event timeline 91 having playback instant indicator 92 set at time corresponding to 4:19:53.00 p.m. that is coupled to a plurality of control objects. Individual ones of the control objects may be arranged to express time-stamped data in a visual presentation which may include both graphical and/or alphanumeric representations.

Most vehicle event recorder systems are incapable of recording data related to throttle position. However, this may remain a factor in accident analysis. For example, it may be useful to understand how much time passes between the time a red light traffic signal appears (detectable via forward view video review—for example) and the time a vehicle operator disengages application of power (e.g. removes foot from an accelerator pedal). Because it may be difficult to arrange a custom sensor to detect accelerator position, many vehicle event recorders may include datasets devoid of this critical data.

While access to this information may be available on a vehicle's ECU system, to date, it has been prohibitively difficult to couple vehicle event recorders to the ECU of modern vehicles. Where that has been achieved, the dataset produced by such advanced vehicle event recorders may include time synchronization management schemes with respect to its video camera. These systems may include time-stamped data regarding throttle state where an event record dataset having such timestamp throttle state data are available. These vehicle event data playback systems may be cooperative and/or provide graphical user interface controls which are suitably responsive to such event record datasets.

A graphical user interface with a throttle state control object may provide graphical expressions of throttle states, and/or other information. The control object may be coupled to an event timeline and/or corresponding event timeline control whereby the instantaneous throttle state for a time in the event period may be selectively displayed by the control.

In some implementations, an instantaneous numeric value 93 (digital) and/or a graphical expression 94 (analog) of the throttle state may be given for individual instants of the timeline control. When the playback instant indicator is moved to another position of the event timeline, the throttle state control may be updated such that data represented there is updated in synchronization with other controls of the graphical user interface, including video.

The video of the video playback control object may indicate a red traffic signal has occurred at 4:19:44. A user/reviewer may be able to see by sliding the playback instant control to that moment of the timeline that the throttle state remained at 100% (recall FIG. 1). However, when the playback instant control is advanced further down the timeline to about 4:19:46, the throttle position may be at 0%, for example.

This may be verified by considering vehicle speed 710 (shown in FIG. 7) data presented in a continuum chart. In it, a user/reviewer may see that the vehicle begins to decelerate just before 4:19:45. While the acceleration data may be a good indicator of when the driver releases the throttle, it will remain imprecise because of mechanical delays inherent vehicle powertrain systems and the overall vehicle dynamics. Also, using acceleration data alone will result in misdetection of vehicle deceleration that may be due to vehicle travelling uphill and the force of gravity acting against the forward momentum of the vehicle. That is, the accelerator pedal may stay depressed at 25%, which may maintain vehicle speed while travelling 55 mph on a level road, but will result in vehicle deceleration should the road grade change to 5% uphill. To learn the precise time the throttle was released, the playback instant control may be manipulated to indicate a time prior to 4:19:45 and the throttle state control may be reviewed. This control may more accurately tell a fuller story as it relates to the question "when did the driver respond" rather than the question "when did the vehicle respond". Accordingly, in some circumstances a throttle state control well synchronized with related data and/or bound to a timeline control unit may tell the full story which otherwise could not be known in the absence of throttle state information.

Similarly, a graphical user interface engine load control object 95 may be included in some versions of these vehicle event data playback systems. Engine load data may help a user reviewing an event via the graphical user interface to understand how heavily loaded the engine is at its given speed (RPM). This may inform the user if the vehicle was heavily loaded with cargo, whether the driver had excess power that he could have used for an evasive maneuver, etc. A sensor installed by a vehicle manufacturer may produce data to indicate engine load on a scale from 0% to 100%. Data from the sensor may be available via the ECU, for example. Data which indicates engine load may be periodically detected and/or captured, then added to the event record dataset produced by the vehicle event recorders. This step may be done with attention to time calibration and/or time synchronization. For example, data from the ECU may arrive at irregular intervals. Or the data may arrive with extreme time jitter between successive measurements. This data may be used in playback systems taught herein after being synchronized with other events encoded in event records. It may not be enough, with respect to the present vehicle event data playback systems, to merely collect multiple readings of engine load. Because of the particular playback characteristics suggested here, engine load data (among other data) may be time stamped before being included as part of these event records.

Another information source which may relate to vehicle performance and/or which may be replayed in these event data playback systems may relate to power distribution. It may be useful to know when engine power is needed by, and/or being delivered to, auxiliary systems. If a vehicle engine is delivering power to coupled power consuming subsystems (e.g. refrigeration, hydraulic actuator, et cetera) an event record may be configured to indicate the status of power takeoff systems.

In some implementations, a power takeoff indicator 96 may be embodied as a binary indicator. A power takeoff control object arranged to indicate binary states for every instant of an event timeline may include a graphical portion, an alpha numeric portion, and/or other portions, for example.

As shown in FIG. 9, other control objects may be provided to visually present data collected from vehicle subsystems. For example, these may include a brake indicator control object 98, an antilock braking system ABS control object 99, an automatic traction control (ATC) control object 910, an electronic stability control ESC control object 911, and/or other control objects. The graphical user interface control objects may be driven by data contained in a vehicle event recorder event dataset, and/or be responsive thereto. These controls may be bound to the timeline control object whereby visual presentation of data in the controls may be time synchronized. These controls may present data in graphical, alphanumeric, and/or other presentations.

In systems which produce data having a limited few states, it may be convenient to present the data states via prescribed and/or preconfigured icon symbols. For example a malfunction indicator light (MIL) system may operate to provide driver alerts with respect to five types of malfunction in addition to a binary 'ON'-'OFF' value 912. A low tire pressure icon 913 may be displayed to indicate a malfunction. The control object, which may remain synchronized with event playback, may be showing its 'ON'-'OFF' indication and/or malfunction type via the displayed icon, for example.

In some implementations, vehicle event recorders may include an excess fuel consumption indicator. When a driver takes an action which may be determined to be one associated with excess fuel consumption, an excess fuel consumption indicator may provide a driver with instant feedback to signal the condition. Where vehicles are equipped with such devices, they may also provide data to be included in a vehicle event recorder event record dataset. Accordingly, these vehicle event data playback apparatus may include an instant driver feedback control object 914. Because feedback may be provided as a three color scheme (for example) in vehicles in which they are deployed, the instant driver feedback control object may similarly express these feedback states. This control object may be an example which illustrates the value of a visual playback of vehicle event records. When an indicator is given to a driver to alert him that a maneuver has caused excess fuel consumption, it may be useful to understand in detail a driver's response in order to administer appropriate coaching. The system described herein may facilitate visualization and/or understanding of details associated with vehicle operation. For example, a reviewer/coach may decipher a driver response to instant feedback relating to fuel consumption maneuvers.

The description of data collected via vehicle event recorder systems is not intended to be limiting. There may be information sources that are not part of the vehicle event recorder which contribute data that may be played back the systems described herein.

In some implementations, vehicle event recorders may record data from vehicle systems, from event records, and/or from other sources, which details many aspects of vehicle and/or driver performance. In some of these systems, a human reviewer may study video captured in an event record and/or prepare notes in accordance with observations made. Some of these notes may be general to the entire event period (e.g. a 'no seat belt' infraction) and/or others may be particular to specific time portions of the event period and/or a single instant in the event period. Once prepared, the notations may become appended to, and/or part of an event record. When event records are played back in these data players, these notations may be displayed via the graphical user interface.

Figure 10:
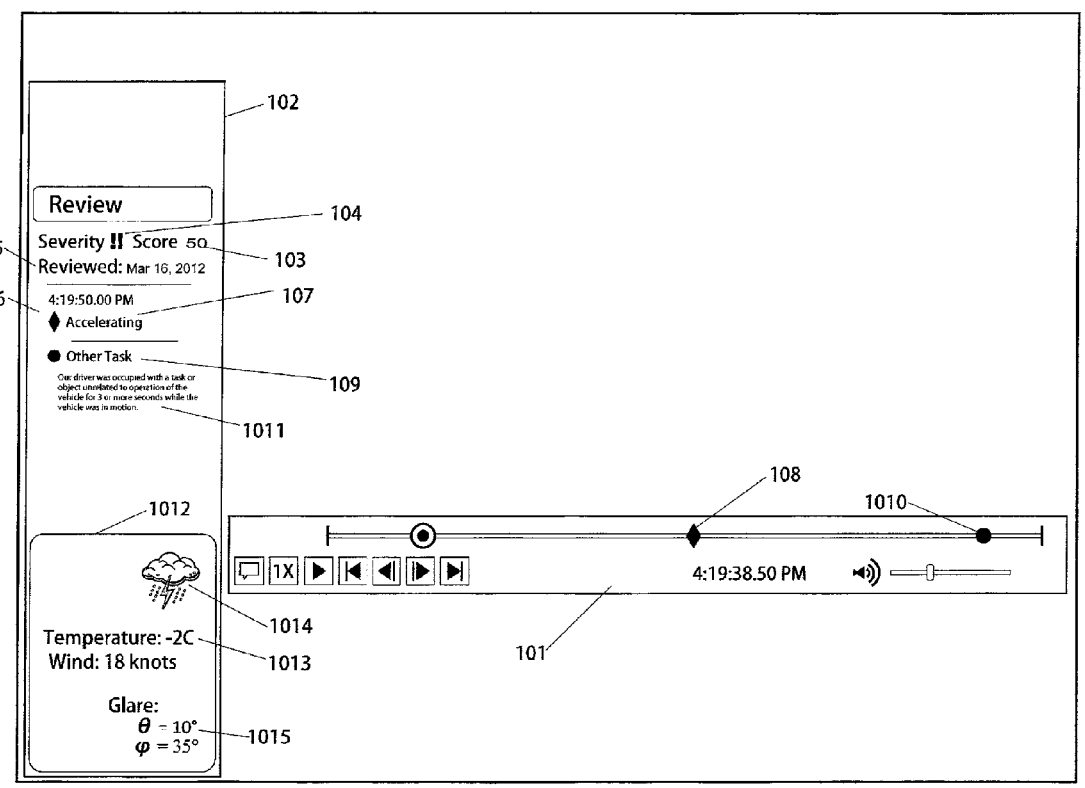
FIG. 10 presents a time responsive notation field type control object and its contents which are bound and responsive to an event timeline.

FIG. 10 shows one illustrated example of a timeline control 101 coupled to a notation field control 102. The notation field may include numeric review data such as a score value 103 and icon indicator 104 related to severity, a review date label 105 and a note list 106 containing therein a plurality of note entries (two notes entries are shown in the example).

A first note 107 relating to an occurrence of "aggressive accelerating" may be coupled to timeline marker pip 108 while "other task" notation 109 may be coupled to timeline marker pip 1010. Finally, note field 1011 may contain text which describes the reviewer's observations as those relate to the 'other task' note. Since these notes relate to specific parts of the event period, event playback may be improved when note text is appropriately displayed with respect to the note time association during the event data playback.

Access to several of these notes may also be affected by pointing and clicking, touching, etc., on the timeline pip marker elements. For example, if a user were to click on/touch the diamond shaped marker pip, the "other task" note closes and the "aggressive accelerating" note opens to reveal text of that note. In this way, access to appended notes may be readily available via timeline cues.

The notation control object described in the foregoing graphs may be illustrative of a first kind of information whose source may not be from onboard a vehicle but may be related to a vehicle event playback. There may be other sources which provide information related to a vehicle event but are not part of the vehicle, any of the vehicle's subsystems, or a vehicle event recorder.

Another information source external from the vehicle may include one which reports on environmental conditions related to the time and location of the recorded event. In one type of environment control object 1012, the state of the weather may be reported as recorded in remote weather reporting stations. For example, if an event recorder produces an event record with location and time information, a weather station may report ambient temperature via text label 1013. It may report whether or not the roadways were dry or wet at that time via icon display 1014. It may indicate whether or not the roads were icy or snowy. These systems may indicate whether or not the event occurred during a windy day. In view of sidereal time, and in view of a vehicle's direction of travel (as recorded by a vehicle event recorder), this control object may indicate the level of sun glare 1015 which may have hindered a driver's visibility during an event. A weather reporting station accessed via the internet (for example) before, during, or after an event record is made, may provide such data.

Other information sources external from the vehicle that may be helpful to a user reviewing an event via the graphical user interface may include databases containing speed limit information and/or road type information (e.g., freeway, major boulevard, two-lane road), sources of information about a traffic level, and/or other information.

Figure 11:
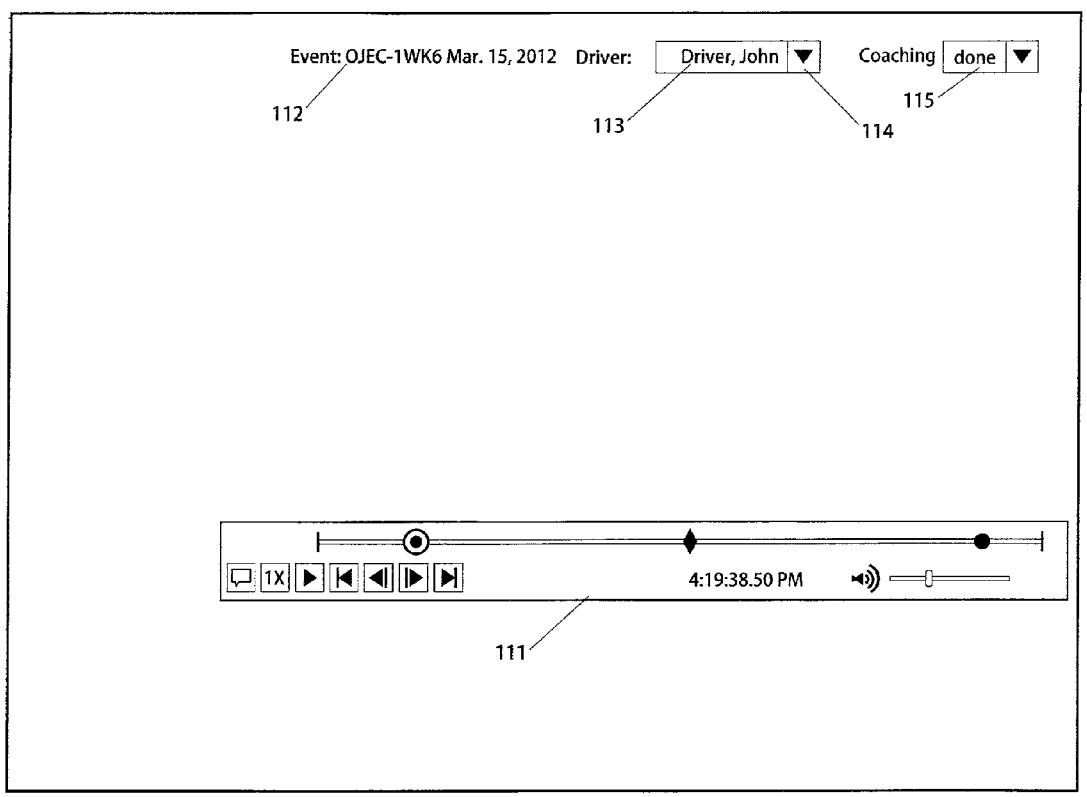
FIG. 11 indicates additional auxiliary elements which may be included in some of these graphical user interface versions.

FIG. 11 illustrates additional features. For reference, event timeline control 111 is illustrated in this drawing. A 'now playing' event label 112 may identify an event which is currently being addressed by, and/or is a subject of the event data player. A driver 113 drop-down type selection box 114 may permit operators of these playback systems to select other fleet drivers to which these playback systems may be pointed to view events associated with that particular driver. Another selection box 115 may enable an administrator to mark an event with additional notations to indicate a training status.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method to synchronize vehicle operation information comprising:

providing a plurality of sensors coupled with a vehicle, the sensors including a first sensor that generates a first output signal conveying information related to a first operating parameter, and a second sensor that generates a second output signal conveying information related to a second operating parameter;

receiving the vehicle operation information via output signals generated by the plurality of sensors, wherein the first output signal is associated with first timing information, and wherein the second output signal is associated with second timing information;

detecting a first vehicle event based on the first output signal and the second output signal, the first vehicle event having a start time and an end time; and responsive to detecting the first vehicle event:

associating information from the first output signal and the second output signal generated during the first vehicle event to create a first event record, wherein the first timing information includes a first time-stamp that indicates the start time of the first vehicle event, wherein the second timing information includes a second time-stamp that indicates the start time of the first vehicle event, and wherein the first time-stamp does not coincide with the second time-stamp; and synchronizing the information from the first output signal and the second output signal generated during the first vehicle event based on analysis of the first time-stamp and the second time-stamp, wherein synchronizing includes identifying and correlating corresponding information associated with physical phenomena in the first output signal and the second output signal during the first vehicle event.

2. The method of claim 1, wherein the vehicle operation information includes one or more of vehicle safety information, vehicle event information, vehicle environment information, or vehicle subsystem information.

3. The method of claim 1, wherein the first operating parameter is related to vehicle safety, and wherein vehicle safety information is received via output signals generated by one or more sensors included in an active safety system coupled with the vehicle.

4. The method of claim 3, wherein the first vehicle event is detected based on the vehicle safety information received from the active safety system.

5. The method of claim 1, further comprising causing a graphical user interface to present the synchronized vehicle operation information to a user.

6. The method of claim 5, wherein a view of the graphical user interface includes one or more active safety system fields, the method further comprising causing the one or more active safety system fields to present information related to detections and/or alerts by an active safety system coupled with the vehicle, the active safety system fields presenting one or more of a textual, a numeric, or a graphical indication of information the active safety system communicates to a driver of the vehicle.

7. The method of claim 1, wherein the first operating parameter is related to vehicle event information and/or vehicle environment information, the method further comprising receiving the vehicle event information and/or the vehicle environment information via output signals generated by one or more sensors included in a vehicle event recorder coupled with the vehicle.

8. The method of claim 1, wherein the first operating parameter is related to vehicle subsystem information, the method further comprising receiving the vehicle subsystem information via output signals generated by one or more sensors associated with an engine control module installed in the vehicle at manufacture.

9. The method of claim 1, wherein the first vehicle event is detected based on a comparison of the information conveyed by the output signals to criteria included in predetermined vehicle event profiles.

10. The method of claim 1, further comprising presenting the synchronized vehicle operation information to a user in real time during operation of the vehicle.

11. A vehicle event data playback apparatus for synchronizing vehicle operation information comprising:
a plurality of sensors coupled with a vehicle, the sensors including a first sensor that generates a first output signal conveying information related to a first operating parameter, and a second sensor that generates a second output signal conveying information related to a second operating parameter;
one or more processors configured to synchronize vehicle operation information, wherein synchronizing the vehicle operation information comprises:
receive the vehicle operation information via output signals generated by the plurality of sensors, wherein the first output signal is associated with first timing information, and wherein the second output signal is associated with second timing information;
detect a first vehicle event based on the first output signal and the second output signal, the first vehicle event having a start time and an end time; and
responsive to detecting the first vehicle event:
associate information from the first output signal and the second output signal generated during the first vehicle event to create a first event record, wherein the first timing information includes a first time-stamp that indicates the start time of the first vehicle event, wherein the second timing information includes a second time-stamp that indicates the start time of the first vehicle event, and wherein the first time-stamp does not coincide with the second time-stamp; and
synchronize the information from the first output signal and the second output signal generated during the first vehicle event based on analysis of the first time-stamp and the second time-stamp, wherein synchronizing includes identifying and correlating corresponding information associated with physical phenomena in the first output signal and the second output signal during the first vehicle event.

12. The vehicle event data playback apparatus of claim 1, wherein the one or more processors are configured such that synchronizing includes searching for expected phenomena in the second output signal that indicate the start time of the first vehicle event, wherein the first timing information indicating one or more of a time of day the information was generated, an order in which the information was generated, or a periodic and/or continuous timing of the generated information.

13. The vehicle data playback apparatus of claim 11, wherein the one or more processors are configured such that the vehicle operation information includes one or more of vehicle safety information, vehicle event information, vehicle environment information, or vehicle subsystem information.

14. The vehicle event data playback apparatus of claim 11, wherein the processors are configured such that the first operating parameter is related to vehicle safety, and wherein the processors receive vehicle safety information via output signals generated by one or more sensors included in an active safety system coupled with the vehicle.

15. The vehicle event data playback apparatus of claim 14, wherein the processors are configured such that the first vehicle event is detected based on the vehicle safety information received from the active safety system.

16. The vehicle event data playback apparatus of claim 11, further comprising a graphical user interface configured to present the synchronized vehicle operation information to a user, wherein the processors cause the graphical user interface to present the synchronized vehicle operation information to the user.

17. The vehicle data playback apparatus of claim 16, wherein a view of the graphical user interface includes one or more active safety system fields, the one or more active safety system fields configured to present information related to detections and/or alerts by an active safety system coupled with the vehicle, the active safety system fields presenting one or more of a textual, a numeric, or a graphical indication of information the active safety system communicates to a driver of the vehicle.

18. The vehicle data playback apparatus of claim 11, wherein the processors are configured such that the first operating parameter is related to vehicle event information and/or vehicle environment information, and wherein the processors receive the vehicle event information and/or the vehicle environment information via output signals generated by one or more sensors included in a vehicle event recorder coupled with the vehicle.

19. The vehicle data playback apparatus of claim 11, wherein the processors are configured such that the first operating parameter is related to vehicle subsystem information, and wherein the processors receive the vehicle subsystem information via output signals generated by one or more sensors associated with an engine control module installed in the vehicle at manufacture.

20. The vehicle data playback apparatus of claim 11, wherein the processors detect the first vehicle event based on a comparison of the information conveyed by the output signals to criteria included in pre-determined vehicle event profiles.

21. The vehicle data playback apparatus of claim 20, wherein the processors are configured such that the pre-determined vehicle event profiles include criteria sets associated with vehicle events, and wherein vehicle events are detected by comparing the information conveyed by the output signals to the criteria sets such that the first vehicle event is detected responsive to the information conveyed by the output signals satisfying one or more individual criteria in a first criteria set associated with the first vehicle event.

22. The vehicle event data playback apparatus of claim 11, further comprising a graphical user interface configured to present the synchronized vehicle operation information to a user, wherein the processors cause the graphical user interface to present the synchronized vehicle operation information to the user in real time during operation of the vehicle.

23. The vehicle event data playback apparatus of claim 11, wherein the processors receive information from one or more sensors including an active safety system sensor, a video camera, an accelerometer, a gyroscope, a geolocation sensor, a radar detector, an engine RPM sensor, a vehicle speedometer, a tilt sensor, or a braking sensor.

\* \* \* \* \*

UNITED STATES PATENT AND TRADEMARK OFFICE
CERTIFICATE OF CORRECTION

PATENT NO. : 9,501,878 B2  
APPLICATION NO. : 14/055833  
DATED : November 22, 2016  
INVENTOR(S) : Jason Palmer et al.

Page 1 of 1

It is certified that error appears in the above-identified patent and that said Letters Patent is hereby corrected as shown below:

In the Claims

Please change Column 24, Line 18 (Claim 12, Line 1) from:  
"12. The vehicle event data playback apparatus of claim 1,"  
To:  
--12. The vehicle event data playback apparatus of claim 11,--.

Signed and Sealed this  
Eighth Day of May, 2018

Andrei Iancu  
*Director of the United States Patent and Trademark Office*